(12) United States Patent
Jobara et al.

(10) Patent No.: US 10,325,356 B2
(45) Date of Patent: Jun. 18, 2019

(54) IMAGE PROCESSING DEVICE, IMAGE PROCESSING METHOD, IMAGING DEVICE, AND RECORDING MEDIUM FOR EXCLUSIVELY PERFORMING ADJUSTMENT PROCESSING OR VIEWPOINT CHANGE PROCESSING

(71) Applicant: CANON KABUSHIKI KAISHA, Tokyo (JP)

(72) Inventors: Masashi Jobara, Kawasaki (JP); Koichi Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 15/350,421

(22) Filed: Nov. 14, 2016

(65) Prior Publication Data

US 2017/0154408 A1 Jun. 1, 2017

(30) Foreign Application Priority Data

Nov. 30, 2015 (JP) .................................. 2015-232925
Sep. 7, 2016 (JP) .................................. 2016-174951

(51) Int. Cl.
*G06T 3/40* (2006.01)
*G06T 5/00* (2006.01)

(52) U.S. Cl.
CPC ............ *G06T 5/003* (2013.01); *G06T 3/4038* (2013.01)

(58) Field of Classification Search
None
See application file for complete search history.

(56) References Cited

U.S. PATENT DOCUMENTS

| 8,773,549 B2 | 7/2014 | Fukuda |
| 8,786,718 B2 | 7/2014 | Sawada |
| 9,426,349 B2 | 8/2016 | Fukuda |

(Continued)

FOREIGN PATENT DOCUMENTS

| JP | 2011-022796 A | 2/2011 |
| JP | 2011-205531 A | 10/2011 |

(Continued)

OTHER PUBLICATIONS

Office Action dated Nov. 7, 2017, issued in counterpart Japanese Patent Application No. 2016-174951, with English translation.

*Primary Examiner* — Xin Sheng
(74) *Attorney, Agent, or Firm* — Venable LLP

(57) ABSTRACT

An image processing device includes at least one processor that acquires a plurality of viewpoint images, and selectively applies a plurality of different image processings to image data based on the plurality of viewpoint images. The plurality of different image processings includes an adjustment process of adjusting a perceived resolution of an image, the adjustment process including a shift synthesis process of relatively shifting the plurality of viewpoint images to synthesize the plurality of viewpoint images that are relatively shifted, and a viewpoint change process of changing a viewpoint by changing a weighting coefficient when the plurality of viewpoint images are synthesized. In addition, the at least one processor sets the image processing by the image processing unit, exclusively setting one of the plurality of different image processings and a parameter of the image processing set by the setting unit to be applied to the image data.

13 Claims, 21 Drawing Sheets

(56) References Cited

U.S. PATENT DOCUMENTS

| | | |
|---|---|---|
| 9,438,786 B2 | 9/2016 | Fukuda |
| 9,769,365 B1 * | 9/2017 | Jannard ................ H04N 5/2254 |
| 2011/0273369 A1 * | 11/2011 | Imai ........................ G06T 15/20 |
| | | 345/158 |
| 2013/0058591 A1 * | 3/2013 | Nishiyama ............. H04N 5/217 |
| | | 382/264 |
| 2013/0182900 A1 * | 7/2013 | Ishii ................... H04N 5/23212 |
| | | 382/103 |

FOREIGN PATENT DOCUMENTS

| | | | |
|---|---|---|---|
| JP | 2011205531 A | * | 10/2011 |
| JP | 2012-186790 A | | 9/2012 |
| JP | 2012-191351 A | | 10/2012 |
| JP | 2012191351 A | * | 10/2012 |
| JP | 2014-228586 A | | 12/2014 |
| JP | 2015-139020 A | | 7/2015 |
| JP | 2015139020 A | * | 7/2015 |
| JP | 2015-210285 A | | 11/2015 |
| WO | 2014/129127 A1 | | 8/2014 |

\* cited by examiner

IMAGE PROCESSING DEVICE, IMAGE PROCESSING METHOD, IMAGING DEVICE, AND RECORDING MEDIUM FOR EXCLUSIVELY PERFORMING ADJUSTMENT PROCESSING OR VIEWPOINT CHANGE PROCESSING

This application claims the benefit of Japanese Patent Application No. 2016-174951, filed Sep. 7, 2016, and Japanese Patent Application No. 2015-232925, filed Nov. 30, 2015, which are hereby incorporated by reference wherein in their entireties.

BACKGROUND OF THE INVENTION

Field of the Invention

The present invention relates to image processing technology using a viewpoint image.

Description of the Related Art

Image processing using a plurality of parallax images (viewpoint images) corresponding to a plurality of viewpoints including the same object image obtained by photographing is proposed. In Japanese Patent Laid-Open No. 2012-186790, technology for generating a captured image of any (virtual) viewpoint according to adjustment of a synthesis ratio of captured images at multiple viewpoints from the captured images is disclosed. In Japanese Patent Laid-Open No. 2014-228586, technology for generating an image refocused on a virtual image plane by relatively shifting and synthesizing a plurality of parallax images acquired from an imaging element in which a plurality of photoelectric conversion units are allocated to one microlens is disclosed.

Both Japanese Patent Laid-Open No. 2012-186970 and Japanese Patent Laid-Open No. 2014-228586 only disclose, however, an image processing device in which one type of image processing is enabled using a plurality of viewpoint images.

SUMMARY OF THE INVENTION

The present invention provides an image processing device including a configuration in which a plurality of types of image processing are able to be applied using a plurality of viewpoint images.

In one aspect of the present invention, an image processing device includes an acquisition unit configured to acquire a plurality of viewpoint images, an image processing unit configured to perform image processing on image data based on the plurality of viewpoint images, and a setting unit configured to set the image processing of the image processing unit, wherein the image processing unit is able to selectively apply a plurality of different image processings to the image data, and wherein the setting unit is able to set whether to apply each of the plurality of image processings to the image data and a parameter of image processing to be applied to the image data.

Further features of the present invention will become apparent from the following description of exemplary embodiments with reference to the attached drawings.

DESCRIPTION OF THE EMBODIMENTS

Figure 1:
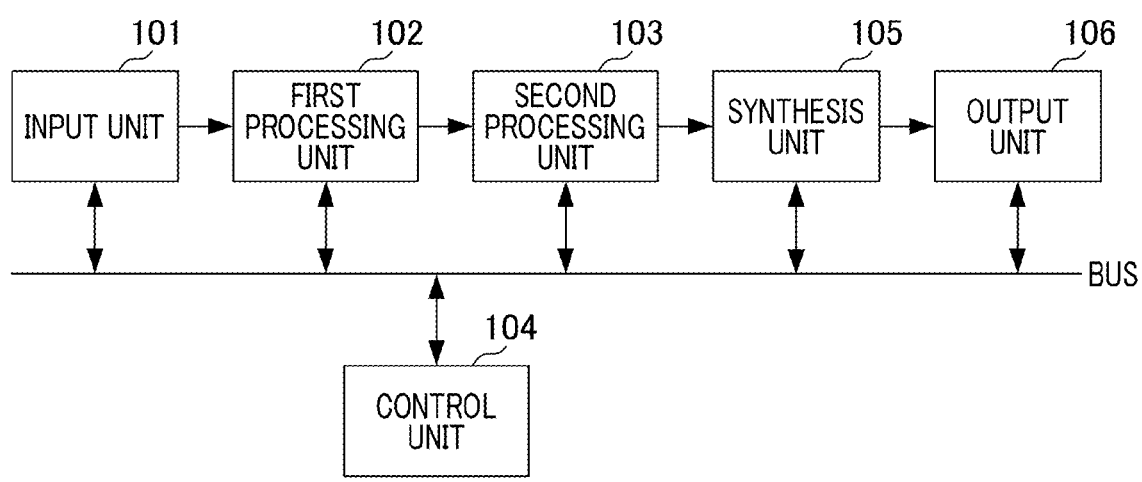
FIG. 1 is a diagram illustrating a basic configuration of an image processing device according to the present invention.

An overview of the invention will be described before description of each embodiment of the present invention. FIG. 1 is a conceptual explanatory diagram illustrating a representative example of a basic configuration of an image processing device according to the present invention. One or more of the functional blocks shown in FIG. 1 may be implemented by hardware, such as an application specific integrated circuit (ASIC) or a programmable logic array (PLA), or may be implemented by a programmable processor, such as a central processing unit (CPU) or a microprocessing unit (MPU) executing software. One or more of the functional blocks may also be implemented using a combination of software and hardware. Accordingly, in the following description, even if different functional blocks are described as an operating subject, the same hardware can be implemented as the subject.

An input unit 101 acquires data of a plurality of viewpoint images. A control unit 104 controls units including the input unit 101. According to an instruction of the control unit 104, a first processing unit 102 determines relative coordinates (a shift amount) of each viewpoint image for acquisition of distribution information, a smoothing process, and for a shift synthesis performed by a synthesis unit 105, to be described below, with respect to the acquired plurality of viewpoint images. A second processing unit 103 determines a synthesis ratio of the plurality of viewpoint images in the viewpoint image synthesis process for reproducing images from various viewpoints. Also, the second processing unit 103 detects a ghost amount (a ghost component) to reduce a ghost (unnecessary light) occurring in a synthesized image. The synthesis unit 105 performs the smoothing process on the plurality of viewpoint images according to a setting of image processing to be applied. The synthesis unit 105 further performs the synthesis process on the images on the basis of the shift amount and the synthesis ratio, subtracts the ghost component detected by the second processing unit 103 from the synthesized image, and transmits the resulting synthesized image to an output unit 106. The output unit 106 processes image data according to an apparatus or a device of an output destination and outputs the processed image data. Image processing to be executed by the first processing unit 102, the second processing unit 103, and the synthesis unit 105 will be described in detail using specific examples in embodiments.

First Embodiment

Figure 2:
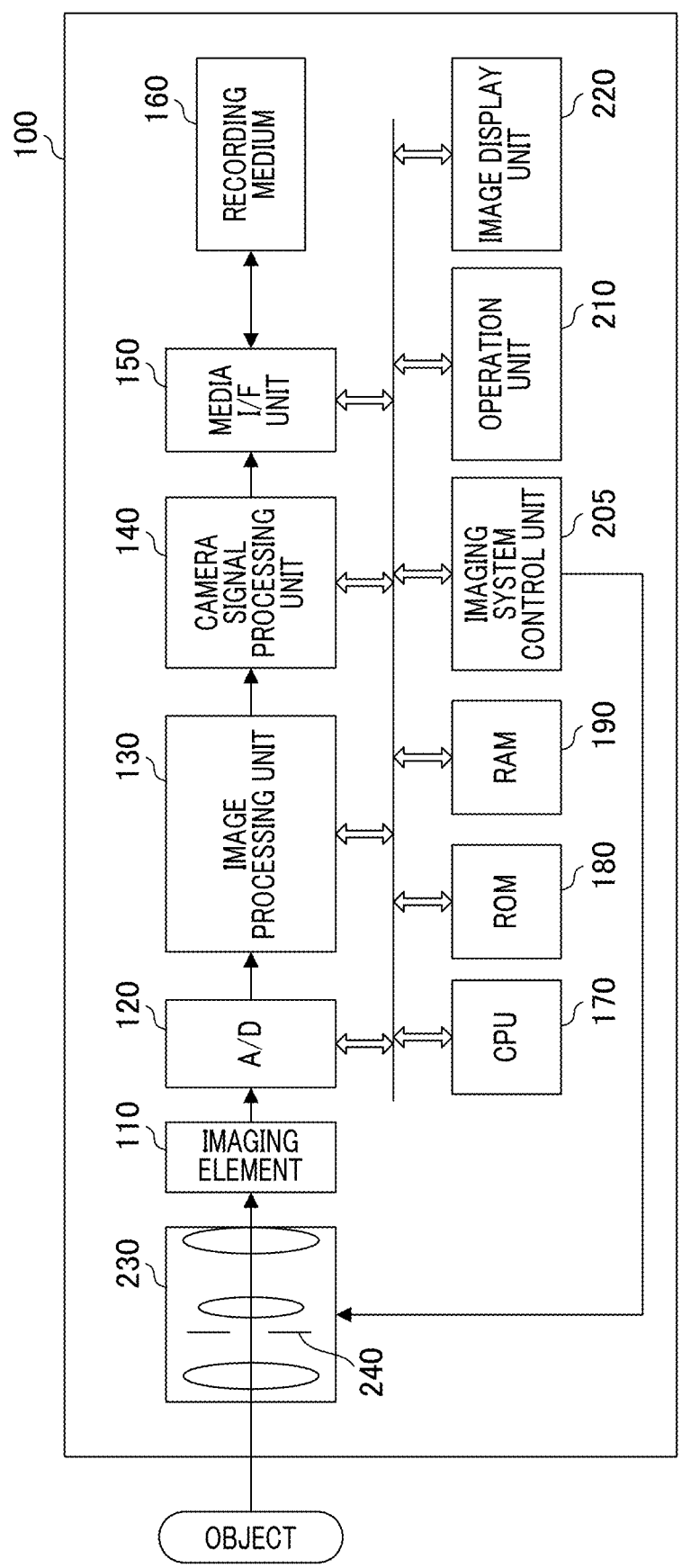
FIG. 2 is a block diagram illustrating a configuration example of an imaging device according to an embodiment of the present invention.

Hereafter, the first embodiment of the present invention will be described in detail. FIG. 2 is a block diagram illustrating a configuration example in which the image processing device of the present embodiment is applied to the imaging device. In the present embodiment, an example of a digital camera 100 capable of recording viewpoint image data will be described.

A photographing lens 230 serves as a plurality of optical members constituting an imaging optical system and includes a lens and an aperture 240. An imaging element 110 converts an optical image of an object formed through the photographing lens 230 into an electrical signal through photoelectric conversion. An analog-to-digital (A/D) converter 120 converts an analog signal output of the imaging element 110 into a digital signal. In the present embodiment, the photographing lens 230, the imaging element 110, and the A/D converter 120 are included in the input unit 101 of FIG. 1.

The image processing unit 130 performs predetermined de-mosaic processing or color conversion processing, or the like, on data from the A/D converter 120 or data recorded on a random access memory (RAM). The image processing unit 130 is included in the first and second processing units 102 and 103 of FIG. 1 and the synthesis unit 105. That is, in the present embodiment, the image processing unit 130 and a CPU 170 perform refocus processing and sharpness/unsharpness control, as will be described below. Further, a process of detecting a ghost on the basis of a difference among a plurality of viewpoint images to control an influence of a ghost appearing in an image and correcting image data to reduce an influence of the ghost is performed. Output data of the A/D converter 120 is written in a RAM 190 via the image processing unit 130 and a camera signal processing unit 140 or directly via the camera signal processing unit 140.

The CPU 170 is a central unit which controls the overall system and corresponds to the control unit 104 of FIG. 1. The CPU 170 performs various types of processes that are shown and described herein by reading and executing a program stored in a read only memory (ROM) 180. An operation unit 210 includes an operation member, such as a shutter release switch, and outputs an operation instruction signal of a user to the CPU 170. For example, according to an operation instruction of a first stage of the shutter release switch, an imaging system control unit 205 controls the driving of the aperture 240 or the lens. AF (autofocus) processing, AE (automatic exposure) processing, AWB (auto white balance) processing, EF (flash pre-emission) processing, or the like starts. According to an operation instruction of a second stage of the shutter release switch, the A/D converter 120 converts an analog output signal of the imaging element 110 into a digital image signal, and the image processing unit 130 and the camera signal processing unit 140 process the digital image signal. The camera signal processing unit 140 acquires an output of the image processing unit 130 or image data from the RAM 190, and executes a developing process using a calculation. For example, the camera signal processing unit 140 performs de-mosaic processing, a defect correction process or a shading correction process specific to the imaging element 110, a process of correcting a black level, or the like, white balance processing, a gamma correction process, a color conversion process, and a noise reduction process. Also, the camera signal processing unit 140 performs a process of compressing image data and the like, and outputs the processed data to a media interface (I/F) unit 150. The media I/F unit 150 executes a recording process of writing image data in a recording medium 160.

The RAM 190 is a memory that stores data of a still image or a moving image after photographing, and has a storage capacity sufficient for storing a predetermined number of still images or moving images of a predetermined time. An image display unit 220 is constituted of a thin film transistor (TFT) type liquid crystal display, or the like, and image display is performed according to display image data written in the RAM 190. Here, the image display unit 220 sequentially displays captured images, thereby implementing a live view function.

Figure 3:
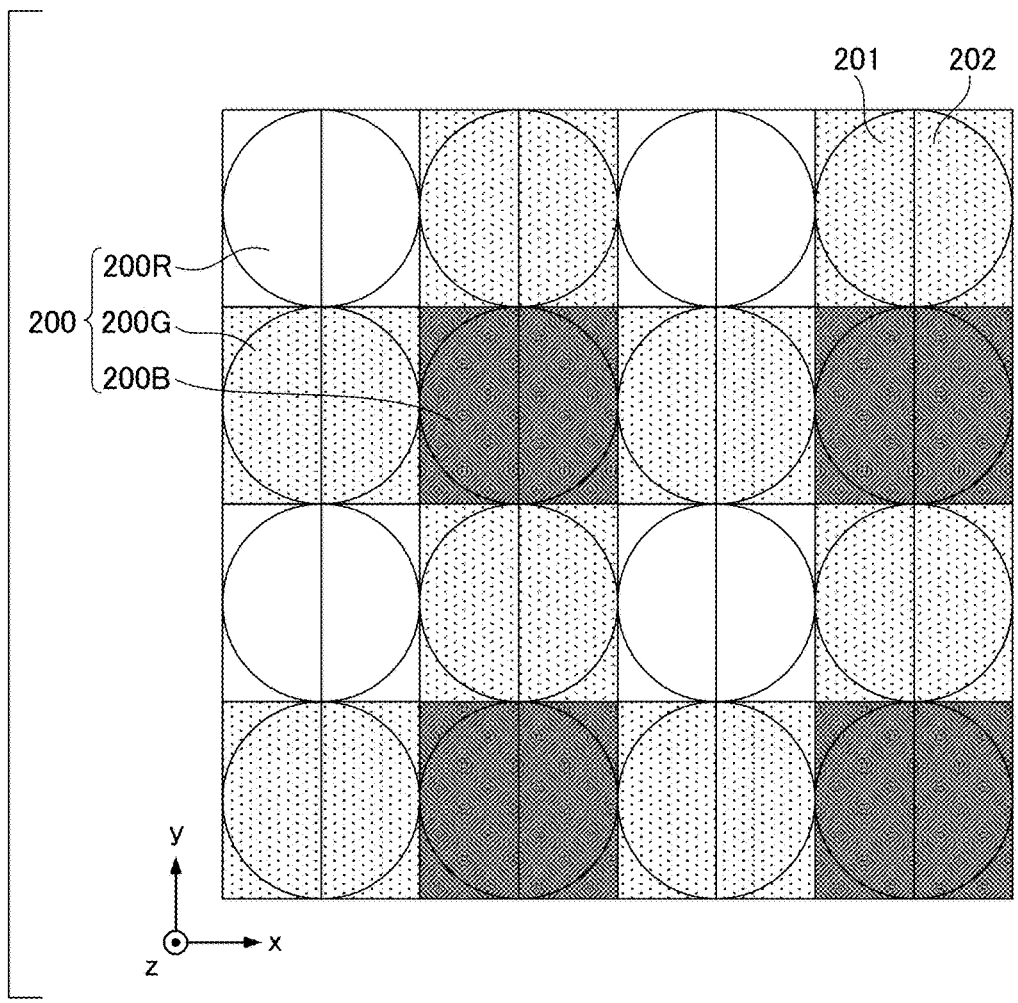
FIG. 3 is a schematic diagram of a pixel array of an imaging element in an embodiment of the present invention.

FIG. 3 is a schematic diagram illustrating a pixel array of the imaging element 110 and illustrates a pixel array of a two-dimensional complementary metal-oxide-semiconductor (CMOS) image sensor. A direction perpendicular to the paper surface of FIG. 3 is defined as a z-direction, a right/left direction is defined as an x-direction, and an up/down direction is defined as a y-direction. Imaging pixels are shown in a range of four rows and four columns and a sub-pixel array is shown in a range of four rows and eight columns. A pixel group 200 of two rows and two columns, illustrated in FIG. 3, includes pixels 200R, 200G, and 200B. The pixel 200R having spectral sensitivity of red (R) is located at an upper-left position in FIG. 3, the pixel 200G having spectral sensitivity of green (G) is located at an upper-right position and a lower-left position, and the pixel 200B having spectral sensitivity of blue (B) is located at a lower-right position. Further, each pixel 200R, 200G, and 200B is constituted of a first sub-pixel 201 and a second sub-pixel 202 arrayed in one row and two columns.

Figure 4A:
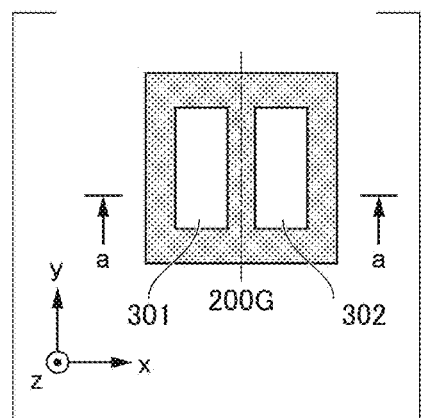
FIGS. 4A and 4B are a schematic plan view and a schematic cross-sectional view, respectively, of the imaging element.
Figure 4B:
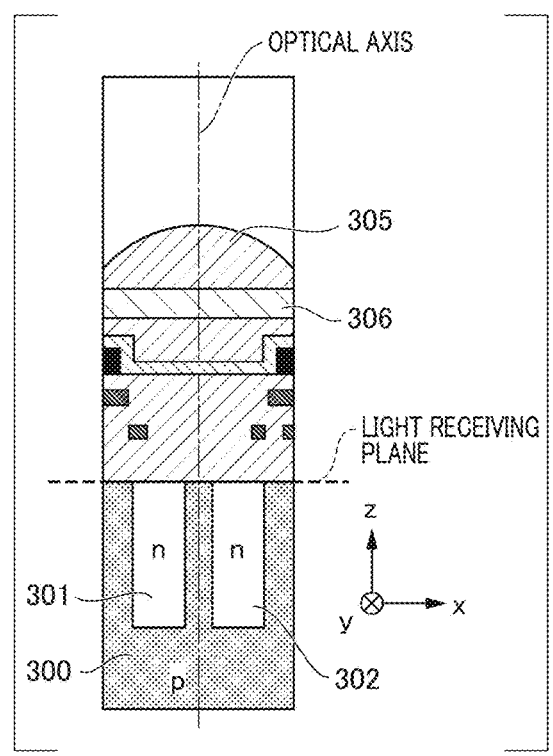

In the imaging element 110, it is possible to acquire a captured image signal and a viewpoint image signal by arranging a large number of imaging pixels of 4 rows and 4 columns (sub-pixels of 4 rows and 8 columns) illustrated in FIG. 3 on an imaging plane. A plan view of one pixel 200G in the imaging element 110 when viewed from a light receiving plane side (a positive z-direction) is illustrated in FIG. 4A. In FIG. 4A, the direction perpendicular to the paper surface is defined as the z-direction, the left/right direction is defined as the x-direction, the up/down direction is defined as the y-direction. The front side is defined as the positive z-direction, the right direction is defined as the positive x-direction, and the up direction is defined as the positive y-direction. A cross-sectional view of the a-a cross section of FIG. 4A viewed from the negative y-direction is illustrated in FIG. 4B. In FIG. 4B, the direction perpendicular to the paper surface is the y-direction, the left-right direction is the x-direction, and the up/down direction is the z-direction In the pixel 200G, a microlens 305 for focusing incident light on the light receiving plane side is formed. The photoelectric conversion unit 300 is divided into $N_H$ divisions in the x-direction and divided into $N_V$ divisions in the y-direction. Although $N_H=2$, $N_V=1$, and two photoelectric conversion units 301 and 302 are formed in the example of FIGS. 4A and 4B, the number of divisions can be arbitrarily set. The photoelectric conversion units 301 and 302 correspond to the first sub-pixel 201 and the second sub-pixel 202, respectively. The photoelectric conversion units 301 and 302 have a pin structure photodiode in which an intrinsic layer is sandwiched between a p-type layer and an n-type layer, or a pn junction photodiode in which the intrinsic layer is omitted.

In each pixel, a color filter 306 between the microlens 305 and the photoelectric conversion units 301 and 302 is formed. When necessary, spectral transmittance of the color filter is changed for each sub-pixel or the color filter is omitted. Light incident on the pixel 200G is focused by the microlens 305 and the photoelectric conversion units 301 and 302 receive light after spectral separation in the photoelectric conversion units 301 and 302. In the photoelectric conversion units 301 and 302, pairs of electrons and holes are generated according to an amount of received light and are separated by a depletion layer, and negatively charged electrons are accumulated in an n-type layer (not illustrated). On the other hand, the holes are discharged outside an imaging element through a p-type layer connected to a constant voltage source (not illustrated). The electrons accumulated in the n-type layers of the photoelectric conversion units 301 and 302 are transferred to a static capacitance unit (FD) via a transfer gate and are converted into a voltage signal, and the voltage signal is output as a pixel signal.

Figures 5A, 5B:
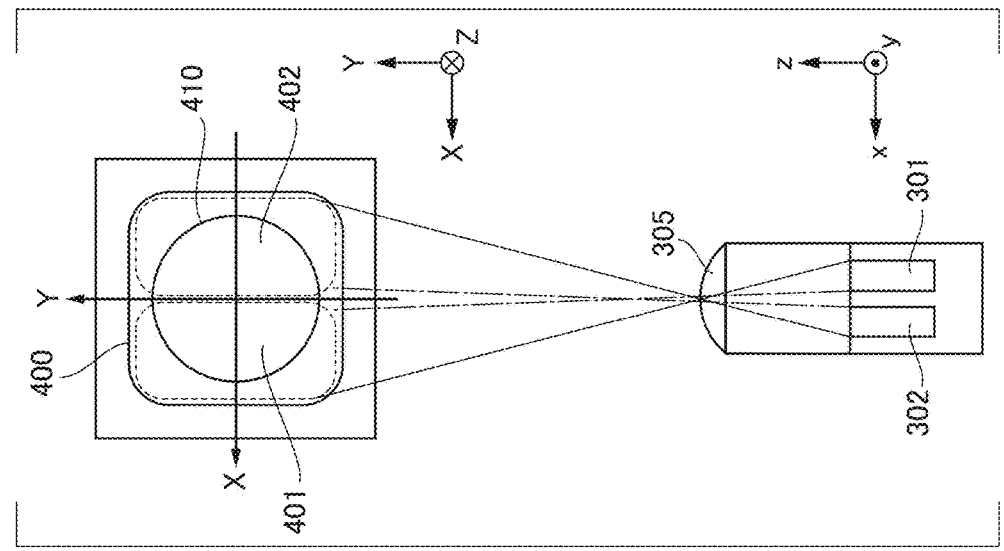
FIGS. 5A and 5B are diagrams illustrating the correspondence between a pixel of the imaging element and a pupil division area.

FIG. 5A is a diagram illustrating a correspondence relationship between the pixel structure and the pupil division illustrated in FIGS. 4A and 4B. A cross-sectional view of a cross section of a pixel structure taken along the line a-a when viewed from the positive y-direction is illustrated in the lower portion of FIG. 5A, and a view of an exit pupil plane of an image forming optical system (see an exit pupil 410) when viewed from the negative z-direction is illustrated in the upper portion of FIG. 5A. In FIG. 5A, the x-axis and the y-axis obtained by inverting the state illustrated in FIG. 4B are illustrated in the cross-sectional view of the pixel structure to take the correspondence with the coordinate axes of the exit pupil plane.

The first pupil part area 401 corresponding to the first sub-pixel 201 is generally set to be in a conjugate relationship by the microlens 305 with respect to a light receiving plane of the photoelectric conversion unit 301 having a center of gravity biased in the negative x-direction. That is, the first pupil part area 401 represents a pupil area capable of being received by the first sub-pixel 201, and has a center of gravity biased in the positive x-direction on an exit pupil plane. In addition, the second pupil part area 402 corresponding to the second sub-pixel 202 is generally set to be in a conjugate relationship by the microlens 305 with respect to a light receiving plane of the photoelectric conversion unit 302 having a center of gravity biased in the positive x-direction. The second pupil part area 402 represents a pupil area capable of being received by the second sub-pixel 202, and has a center of gravity biased in the negative x-direction on an exit pupil plane.

Figure 6A:
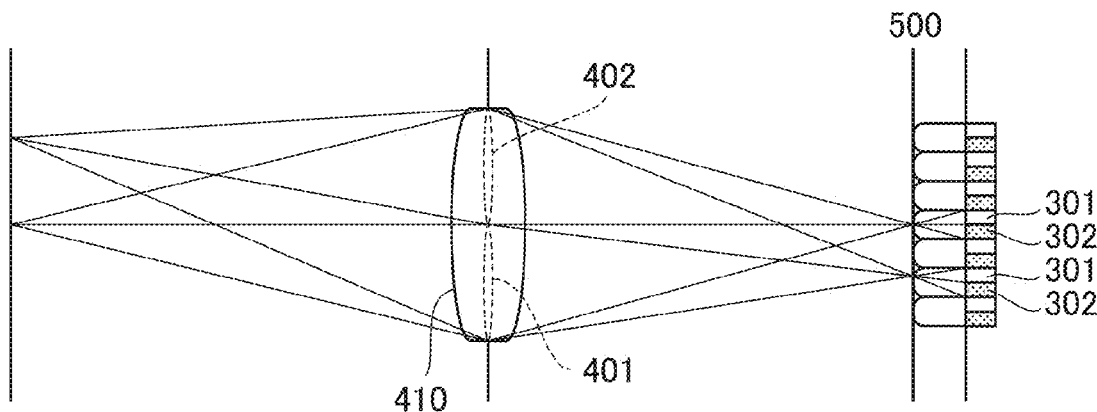
FIGS. 6A and 6B are diagrams illustrating a relationship between a pupil division, a defocus amount, and an image shift amount.

An area 400 illustrated in FIG. 5A is a pupil area in which light can be received by the entire pixel 200G when the photoelectric conversion unit 301 and the photoelectric conversion unit 302 (the first sub-pixel 201 and the second sub-pixel 202) are combined. A correspondence relationship between the imaging element and the pupil division is illustrated in a schematic diagram of FIG. 6A. Light beams passing through the first pupil part area 401 and the second pupil part area 402 are incident on pixels of the imaging element at different angles. Incident light on the imaging plane 500 is received by each of the photoelectric conversion units 301 and 302 of $N_H(=2) \times N_V (=1)$ divisions and each of the photoelectric conversion unit 301 and 302 converts light into an electrical signal.

The image processing unit 130 generates a first viewpoint image by collecting light reception signals of the first sub-pixels 201 of pixel units, and generates a second viewpoint image by collecting light reception signals of the second sub-pixels 202 in focus detection. Also, the image processing unit 130 generates an imaging signal of predetermined resolution by adding a signal of the first sub-pixel 201 to a signal of the second sub-pixel 202 to output captured image data. Relationships between image shift amounts and defocus amounts of the first viewpoint image and the second viewpoint image calculated for focus detection during imaging, a process of adjusting perceived resolution characteristics in the present embodiment, or the like will be described with reference to FIG. 6B.

Figure 6B:
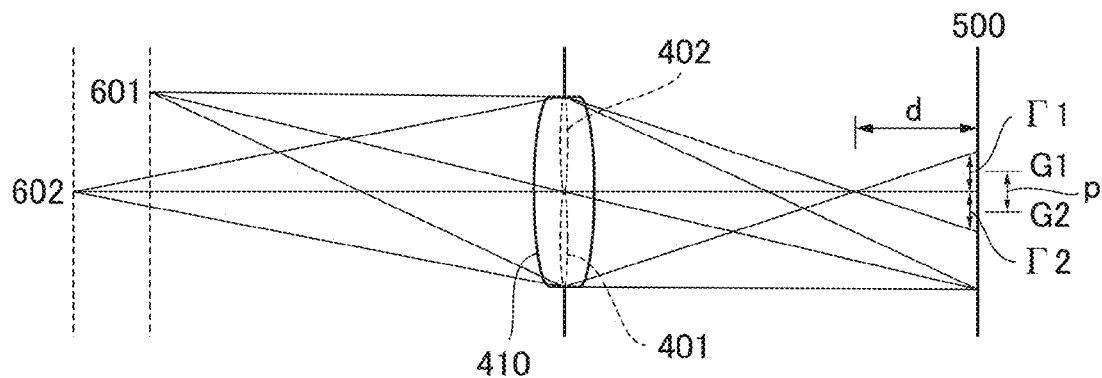

In FIG. 6B, an imaging element (not illustrated) is arranged on the imaging plane 500. The exit pupil 410 of the image forming optical system is divided into two areas of a first pupil part area 401 and a second pupil part area 402. In the defocus amount d, a magnitude of the defocus amount d indicates a distance from an image formation position of an object image to the imaging plane 500. A direction in which a negative sign (d<0) is set in a front focus state, in which the image formation position of the object image is at the object side rather than the imaging plane 500, and a positive sign (d>0) is set in a rear focus state opposite to the front focus state, is defined. In the focus state, in which the image formation position of the object image is in the imaging plane (the focus position), d=0. An example in which the position of the object 601 illustrated in FIG. 6B is a position corresponding to the focus state (d=0) is shown, and an example in which the position of the object 602 is a position corresponding to the front focus state (d<0) is shown. Hereinafter, the front focus state (d<0) and the rear focus state (d>0) are collectively referred to as the defocus state (|d|>0).

In the front focus state (d<0), a light beam passing through the first pupil part area 401 (or the second pupil part area 402) among light beams from the object 602 extends to a width Γ1 (or Γ2) around a center-of-gravity position G1 (or G2) of the light beam after being focused once. In this case, a blurred image occurs in the imaging plane 500. For the blurred image, light is received by the first sub-pixel 201 (or the second sub-pixel 202) constituting each pixel arrayed in the imaging element and the first viewpoint image (or the second viewpoint image) is generated. Consequently, the first viewpoint image (or the second viewpoint image) is detected as an object image (a blurred image) having the width Γ1 (or Γ2) at the center-of-gravity position G1 (or G2) on the imaging plane 500. The width Γ1 (or Γ2) of the object image generally increases in proportion to an increase of the magnitude |d| of the defocus amount d. Likewise, when an image shift amount of the object image between the first viewpoint image and the second viewpoint image is denoted by "p", a magnitude |p| of the shift image amount p increases according to an increase of the magnitude |d| of the defocus amount d. For example, the image shift amount p is defined as a difference "G1-G2" between center-of-gravity positions of light beams, and the magnitude |p| increases generally in proportion to an increase of |d|. Also, although the image shift direction of the object image between the first viewpoint image and the second viewpoint image in the rear focus state (d>0) is opposite to that in the front focus state, there is a similar trend. In the present embodiment, when magnitudes of defocus amounts d of the first viewpoint image and the second viewpoint image or an imaging signal obtained by adding the first viewpoint image and the second viewpoint image increase, the magnitude |p| of the image shift amount p between the first viewpoint image and the second viewpoint image increases.

Next, various types of image processing distinctive to the present embodiment to be performed by the image processing unit 130 will be described. In the present embodiment, some or all of a process of adjusting a perceived resolution, a process of generating an image in which a viewpoint is changed, and a process of reducing a ghost (unnecessary light) occurring in an image are performed as a process to be performed on the image using a plurality of viewpoint images.

For example, the process of adjusting a perceived resolution will be described. Here, the perceived resolution represents the overall impression of sharpness from the resolution of an object image, an edge, blurriness, etc. in an image. That is, the process of adjusting a perceived resolution in the present embodiment includes a process of adjusting at least one of parameters of the image. For example, it is conceivable to increase the sharpness by the adjustment of luminance, saturation, and hue of the image, and the process of adjusting the perceived resolution is not limited to the above-described process, and other processes may be included.

Hereafter, a process necessary for each viewpoint image acquired in the present invention for adjusting the perceived resolution will be described. First, the properties of a pixel signal obtained by a light beam incident on each pixel (the photoelectric conversion element) of the imaging element 110 in the present embodiment will be described.

If light is incident on the microlens 305 formed in each pixel 200R, 200G, 200B, the incident light is focused at a focus position by the microlens 305. Because of an influence of diffraction due to the wave nature of light, however, the diameter of a light focus spot cannot be less than a diffraction limit A, and has a finite magnitude. While a light receiving plane size of the photoelectric conversion unit 301, 302 is about 1 to 2 μm, a light focus size of the microlens 305 is about 1 μm. Thus, the first and second pupil part areas 401 and 402 in a conjugate relationship with the light receiving plane of the photoelectric conversion unit 301, 302 via the microlens 305 are not clearly divided due to a diffraction blur, and have a light receiving rate distribution (a pupil intensity distribution) depending upon an incident angle of light.

FIG. 5B illustrates an example of the light receiving rate distribution (the pupil intensity distribution) depending upon the incident angle of light. The horizontal axis represents pupil coordinates and the vertical axis represents a light receiving rate. A graph line L1, indicated by the solid line in FIG. 5B, represents a pupil intensity distribution along the x-axis of the first pupil part area 401 of FIG. 5B. The light receiving rate indicated by the graph line L1 rapidly increases from a left end to reach a peak, and then gradually decreases and reaches a right end after the rate of change decreases. Also, a graph line L2, indicated by the dotted line in FIG. 5B, represents a pupil intensity distribution along the x-axis of the second pupil part area 402. In contrast to the graph line L1 (symmetrically with respect to the right and left sides), the light receiving rate indicated by the graph line L2 rapidly increases from a right end to reach a peak, and then gradually decreases and reaches a left end after the rate of change decreases. As illustrated, it can be seen that the pupil is gradually divided. Even when a shift synthesis (refocusing) process of performing a relative shift between viewpoint images and synthesizing shifted images is performed on a plurality of viewpoint images obtained in a state in which the gradual pupil division is performed, the effect is reduced because clear pupil division has not been performed initially. Therefore, in the present embodiment, a crosstalk correction (smoothing) process for emphasizing the pupil division (pupil separation) among a plurality of viewpoint images is performed for a process of adjusting the perceived resolution.

Refocus Process and Sharpness/Unsharpness Control

In the present embodiment, a refocus process of re-correcting a focus position after imaging for a captured image using relationships between defocus amounts and image shift amounts of the first viewpoint image and the second viewpoint image is performed. In the present embodiment, a process in which the following two processes are combined is performed as the refocus process. One process is a refocus process based on a shift synthesis process using the first viewpoint image and the second viewpoint image. The other process is sharpness/unsharpness control for adaptively controlling an area having a high degree of sharpness and an area having a high degree of blurriness by sharpening and smoothing according to an image shift difference amount distribution. The embodiment is not limited thereto, however, and only one of the above-described refocus process and sharpness/unsharpness control may be applied to the image. If one process is performed, it is only necessary to omit a step related to only the other process.

Figure 7:
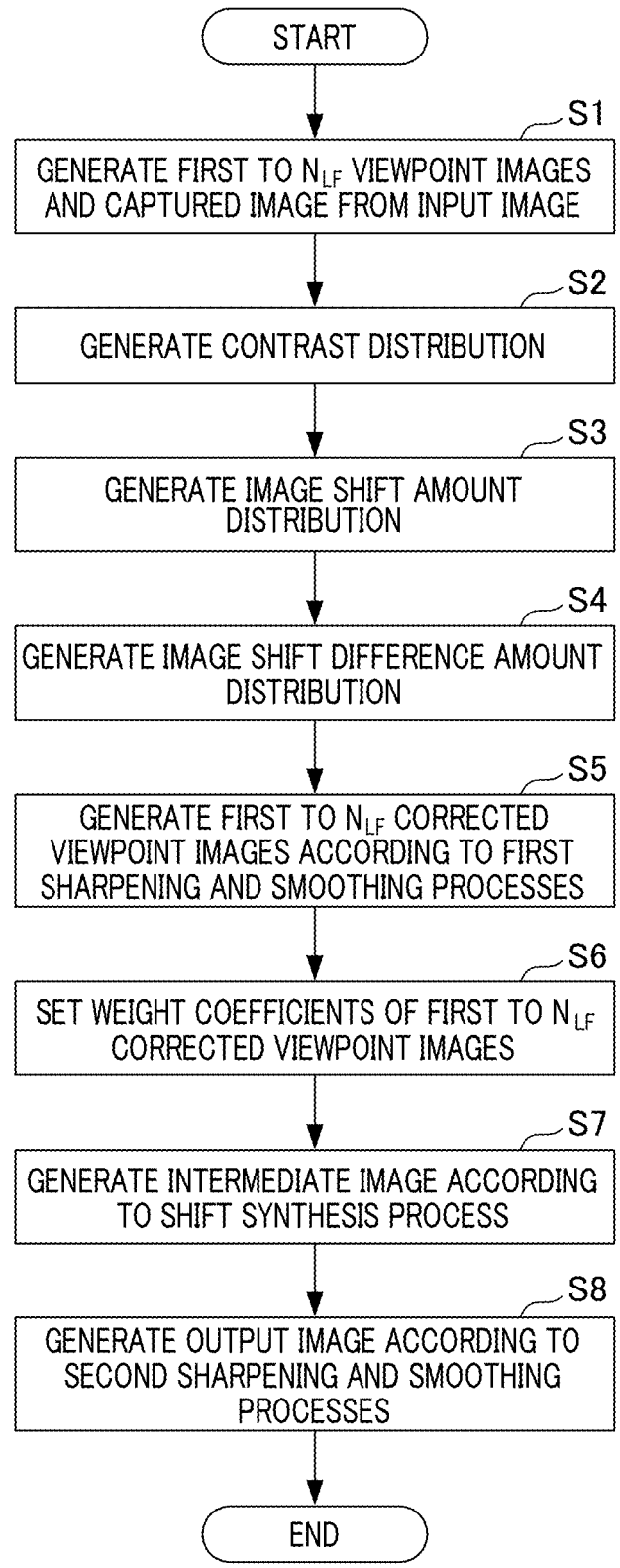
FIG. 7 is a flowchart of a process of adjusting a perceived resolution in an embodiment of the present invention.

FIG. 7 is a flowchart illustrating an overview of a flow of the refocus process and the sharpness/unsharpness control. The process of FIG. 7 is executed by the CPU 170 and the image processing unit 130 that are image processing means of the present embodiment.

Multi-Viewpoint Image and Capturing Image

In step S1 of FIG. 7, a plurality of viewpoint images are generated from LF data (an input image) acquired by the imaging element of the present embodiment for each different pupil part area of the image forming optical system. For an image displayed for the setting of a parameter of each image processing, a process of generating a captured image (a synthesized image) according to a pupil area obtained by synthesizing different pupil part areas of the image forming optical system is performed. Although the LF data (the input image) acquired by the imaging element in step S1 is input, LF data (the input image) saved in a recording medium through photographing by the imaging element in advance may be read and used.

Next, in step S1, the first viewpoint image and the second viewpoint image (first to $N_{LF}{}^{th}$ viewpoint images) are generated for each different pupil part area of the image forming optical system. The LF data (the input image) is denoted by LF. Also, a $k^{th}$ sub-pixel signal is provided by designating a sub-pixel signal that is $i_s{}^{th}$ ($1 \leq i_s \leq N_x$) in the column direction and is $j_s{}^{th}$ ($1 \leq j_s \leq N_y$) in the row direction as $k = N_x(j_s-1)+i_s$ ($1 \leq k \leq N_{LF}$) within each pixel signal of the LF data. A $k^{th}$ viewpoint image $I_k(j, i)$ that is $i^{th}$ in the column direction and is $j^{th}$ in the row direction corresponding to the $k^{th}$ pupil part area of the image forming optical system is generated by Formula (1).

$$I_s(j,i) = I_{N_x(j_s-1)+i_s}(j,i) = LF(N_y(j-1)+j_s, N_x(i-1)+i_s). \quad (1)$$

In the present embodiment, an example of two divisions in the x-axis direction for $N_x=2$, $N_y=1$, and $N_{LF}=2$ is shown. A process of selecting a signal of a specific sub-pixel from the first sub-pixel 201 and the second sub-pixel 202 obtained by dividing the pixel into two sub-pixels in the x-direction (first to $N_{LF}{}^{th}$ sub-pixels obtained by dividing the pixel into $N_x \times N_y$ sub-pixels) for each pixel from the LF data (the input data) corresponding to the pixel array illustrated in FIG. 3 is executed. The first viewpoint image and the second viewpoint image (the $N_{LF}{}^{th}$ viewpoint image) that are RGB signals of a Bayer array having a resolution of the number of pixels N corresponding to a specific pupil part area of the first pupil part area 401 and the second pupil part area 402 (the $N_{LF}{}^{th}$ pupil part area) of the image forming optical system are generated.

Figure 8:
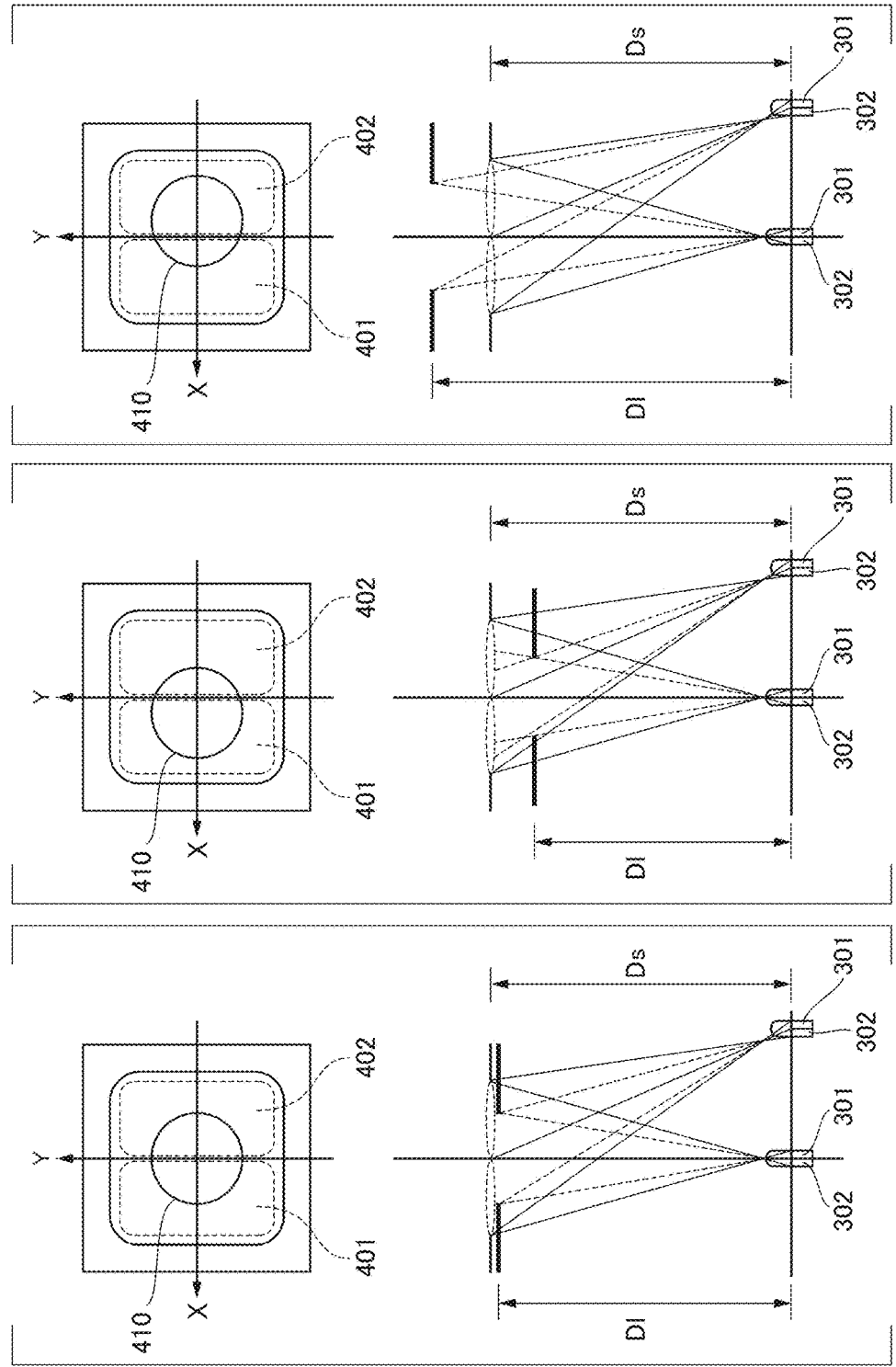
FIGS. 8A to 8C are diagrams illustrating shading due to pupil shifts.

Here, shading due to pupil shifts of the first viewpoint image and the second viewpoint image (first to $N_{LF}{}^{th}$ viewpoint images) will be described. In FIGS. 8A to 8C, a relationship of the first pupil part area 401 in which the first photoelectric conversion unit 301 receives light at a peripheral image height of the imaging element, the second pupil part area 402 in which the second photoelectric conversion unit 302 receives light, and the exit pupil 410 of the image forming optical system is illustrated. The same parts as those of FIGS. 4A and 4B are denoted by the same reference signs. The first photoelectric conversion unit 301 and the second photoelectric conversion unit 302 (first to $N_{LF}{}^{th}$ photoelectric conversion units) correspond to the first sub-pixel 201 and the second sub-pixel 202 (first to $N_{LF}{}^{th}$ sub-pixels), respectively.

FIG. 8A illustrates the case in which an exit pupil distance Dl of the image forming optical system is the same as a set pupil distance Ds of the imaging element. In this case, the exit pupil 410 of the image forming optical system is generally equally divided by the first pupil part area 401 and the second pupil part area 402. On the other hand, if the exit pupil distance Dl of the image forming optical system illustrated in FIG. 8B is shorter than the set pupil distance Ds of the imaging element, a pupil shift between the exit pupil of the image forming optical system and the incident pupil of the imaging element occurs at the peripheral image height of the imaging element and the exit pupil 410 of the image forming system is unequally divided. Likewise, if the exit pupil distance Dl of the image forming optical system illustrated in FIG. 8C is longer than the set pupil distance Ds of the imaging element, a pupil shift between the exit pupil of the image forming optical system and the incident pupil of the imaging element occurs at the peripheral image height of the imaging element and the exit pupil 410 of the image forming system is unequally divided. When the pupil division is unequal at the peripheral image height, intensities of the first viewpoint image and the second viewpoint image are unequal, and shading in which the intensity of one of the first viewpoint image and the second viewpoint image increases and the intensity of the other decreases occurs for every RGB.

When necessary, to improve the shading of each viewpoint image, a shading correction process (an optical correction process) may be performed on each of the first viewpoint image and the second viewpoint image (the first to $N_{LF}{}^{th}$ viewpoint images) for every RGB. In addition, when necessary, a defect correction process, a saturation process, de-mosaic processing, or the like may be performed.

In step S1 of FIG. 7, a process of generating a captured image (a synthesized image) according to a pupil area obtained by synthesizing different pupil part areas of the image forming optical system is performed. A captured image $I(j, i)$ that is $i^{th}$ in the column direction and is $j^{th}$ in the row direction is generated by Formula (2).

$$I(j, i) = \sum_{k=1}^{N_{LF}} I_k(j, i) = \sum_{j_S=1}^{N_y} \sum_{i_S=1}^{N_x} LF(N_y(j-1) + j_S, N_x(i-1) + i_S). \quad (2)$$

Figure 9:
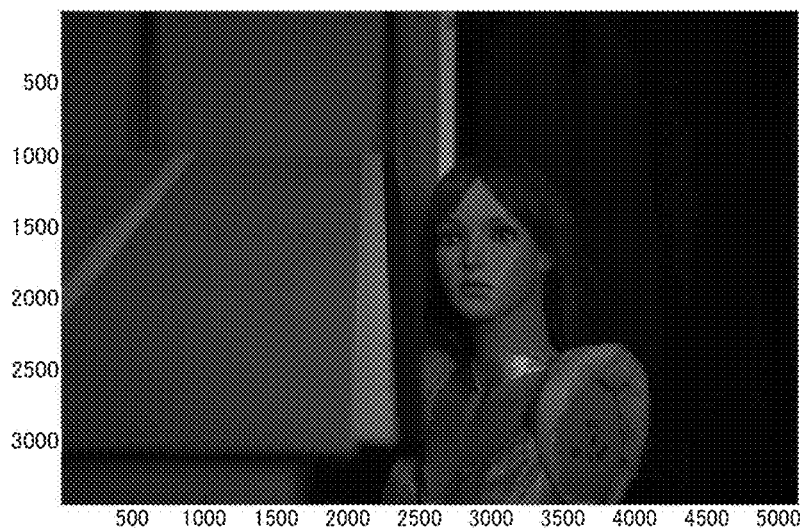
FIG. 9 is a diagram illustrating an example of a captured image.

In the present embodiment, an example of two divisions in the x-axis direction for $N_x=2$, $N_y=1$, and $N_{LF}=2$ is shown. A process of synthesizing both signals of the first sub-pixel 201 and the second sub-pixel 202 obtained by dividing each pixel into two sub-pixels in the x-axis direction from an input image corresponding to a pixel array illustrated in FIG. 3 and generating a captured image which is an RGB signal of the Bayer array having a resolution of the number of pixels N is performed. When necessary, a shading correction process, a defect correction process, a saturation process, de-mosaic processing, and the like may be performed. FIG. 9 illustrates an example of a captured image subjected to the de-mosaic processing of the present embodiment. A doll that is a main object is arranged in the center of FIG. 9 and a plate of a fine checkered pattern sloping from the front side to the back side is arranged on the left side of FIG. 9.

In the present embodiment, as described above, a plurality of viewpoint images are generated for each different pupil part area from an input image acquired by the imaging element in which a plurality of pixels having a plurality of photoelectric conversion units for receiving light beams passing through different pupil part areas of the image forming optical system are arrayed. A captured image according to a pupil area obtained by synthesizing the different pupil part areas is generated. The present invention is not limited thereto, however, and the invention can be applied as long as a plurality of viewpoint images and a synthesized image thereof can be acquired by the well-known technology in the present embodiment and the other embodiments. For example, as in Japanese Patent Laid-Open No. 2011-22796, different cameras of a plurality of viewpoints may be integrated and the integrated cameras may be configured to be regarded as the imaging element 110. In addition, differently from the optical systems of FIGS. 2 and 3, an image of a light beam from the photographing optical system may be formed on a microlens array, and the imaging element may be configured to be provided on the image formation plane so that a physical object plane and the imaging element are in a conjugate relationship. Further, the light beam from the photographing optical system may be subjected to image reformation on the microlens array (this is referred to as image reformation because image formation is performed in a state in which a light beam subjected to image formation once is diffused) and the imaging element may be configured to be provided on the image formation plane. Also, a method of inserting a mask having a suitable pattern (a gain modulation element) into an optical path of the photographing optical system can be used.

Contrast Distribution

Next, a process of calculating the contrast distribution to be used in the sharpness/unsharpness control will be described. In step S2 of FIG. 7, the contrast distribution is generated by extracting a high-frequency band component of a spatial frequency for every area from each of the captured image (the synthesized image) of the present embodiment and the plurality of viewpoint images. The contrast distribution of the present embodiment is adjusted according to a difference between viewpoint images.

In step S2 of FIG. 7, an imaging luminance signal Y is first generated according to Formula (3A) by causing the centers of gravity of the colors RGB to match one another for every position (j, i) from a captured image I(j, i) that is an RGB signal of the Bayer array. Likewise, a $k^{th}$ viewpoint luminance signal $Y_k$ is generated according to Formula (3B) from a $k^{th}$ viewpoint image $I_k$ (k=1 to $N_{LF}$) that is an RGB signal of the Bayer array.

$$Y(j, i) = \begin{pmatrix} I(j-1, i-1) & I(j-1, i) & I(j-1, i+1) \\ I(j, i-1) & I(j, i) & I(j, i+1) \\ I(j+1, i-1) & I(j+1, i) & I(j+1, i+1) \end{pmatrix} \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix}, \quad (3A)$$

$$Y_k(j, i) = \quad (3B)$$

$$\begin{pmatrix} I_k(j-1, i-1) & I_k(j-1, i) & I_k(j-1, i+1) \\ I_k(j, i-1) & I_k(j, i) & I_k(j, i+1) \\ I_k(j+1, i-1) & I_k(j+1, i) & I_k(j+1, i+1) \end{pmatrix} \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix}.$$

Next, in step S2, using a two-dimensional band-pass filter for extracting a high-frequency component of a spatial frequency, an imaging high-frequency signal dy(j, i) is generated according to Formula (4A) from the imaging luminance signal Y(j, i). The two-dimensional band-pass filter is designated as $\{F_{BPF}(j_{BPF}, i_{BPF})|-n_{BPF} \leq j_{BPF} \leq n_{BPF}, -m_{BPF} \leq i_{BPF} \leq m_{BPF}\}$. Likewise, a $k^{th}$ viewpoint high-frequency signal $dY_k$ is generated according to Formula (4B) from the $k^{th}$ viewpoint luminance signal $Y_k$(j, (k=1 to $N_{LF}$).

$$dY(j, i) = \quad (4A)$$
$$\left| \sum_{j_{BPF}=-n_{BPF}}^{n_{BPF}} \sum_{i_{BPF}=-m_{BPF}}^{m_{BPF}} F_{BPF}(j_{BPF}, i_{BPF}) \times Y(j + j_{BPF}, i + i_{BPF}) \right|,$$

$$dY_k(j, i) = \quad (4B)$$
$$\left| \sum_{j_{BPF}=-n_{BPF}}^{n_{BPF}} \sum_{i_{BPF}=-m_{BPF}}^{m_{BPF}} F_{BPF}(j_{BPF}, i_{BPF}) \times Y_k(j + j_{BPF}, i + i_{BPF}) \right|.$$

In the present embodiment, an example of two divisions in the x-axis direction for $N_x$=2, $N_y$=1, and $N_{LF}$=2 is shown. An example in which the two-dimensional band-pass filter is configured by a direct product of a one-dimensional filter $Fx(i_{BPF})$ of the x-axis direction (a pupil division direction) and a one-dimensional filter $Fy(j_{BPF})$ of the y-axis direction (a direction orthogonal to the pupil division direction) is shown. That is, the two-dimensional band-pass filter is designated as $F_{BPF}(j_{BPF}, i_{BPF})=Fy(j_{BPF}) \times Fx(i_{BPF})$. It is possible to use a one-dimensional band-pass filter such as, for example, 0.5×[1, 2, 0, −2, −1]+1.5×[1, 0, −2, 0, 1], to extract a high-frequency component of a spatial frequency of the x-axis direction in the one-dimensional filter $Fx(i_{BPF})$ of the x-axis direction.

Here, a mixed filter obtained by combining a primary differential filter [1, 2, 0, −2, −1] and a secondary differential filter [1, 0, −2, 0, 1] is used. In general, when a differential filtering process is performed, 0 point is in a portion at which there is change from the positive sign to the negative sign in a signal after the filtering process. Thus, a joint may be generated in an area including a high-frequency component of the spatial frequency through combination with the calculation of an absolute value. A position at which the joint is generated differs according to an order of differentiation of the differential filter. Consequently, in the present embodiment, the generation of the joint is suppressed using the mixed filter in which the primary differential filter and the secondary differential filter (generally, differential filters having different orders) are combined.

When necessary, a primary differential filter, such as [1, 2, 0, −2, −1], a secondary differential filter, such as [1, 0, −2, 0, 1], a high-order differential filter, or a more general primary band-pass filter may be used. It is possible to use a high-frequency cut (low-pass) filter such as, for example, [1, 1, 1, 1, 1] or [1, 4, 6, 4, 1], to suppress high-frequency noise of the y-axis direction in the primary filter Fy ($J_{BPF}$) of the y-axis direction orthogonal to the pupil division direction. When necessary, a low-pass filtering process of extracting a high-frequency component of a spatial frequency may be performed in either the x-axis direction or the y-axis direction. Although an example of a two-dimensional band-pass filter configured by a direct product of two one-dimensional filters is shown in the present embodiment, the present invention is not limited thereto, and a general two-dimensional band-pass filter can be used.

Next, in step S2 of FIG. 7, a normalized imaging high-frequency signal dZ(j, i) obtained by normalizing the imaging high-frequency signal dY(j, i) by an imaging luminance signal Y(j, i) using $Y_0$>0 is generated according to Formula (5A). Likewise, a normalized $k^{th}$ viewpoint high-frequency signal $dZ_k$(j, i) obtained by normalizing a $k^{th}$ viewpoint high-frequency signal $dY_k$(j, i) (k=1 to $N_{LF}$) according to a $k^{th}$ viewpoint luminance signal $Y_k$(j, i) is generated according to Formula (5B). A determination of a maximum value of the high-frequency signal and $Y_0$ in the denominator is to prevent division by 0. When necessary, before the normalization in Formulas (5A) and (5B), a high-frequency cut (low-pass) filtering process is performed on the imaging luminance signal y(j, i) and the $k^{th}$ viewpoint luminance signal $Y_k$(j, i) and high-frequency noise may be suppressed.

$$dZ(j,i)=dY(j,i)/\max(Y(j,i),Y_0), \quad (5A)$$

$$dZ_k(j,i)=dY_k(j,i)/\max(Y_k(j,i),Y_0). \quad (5B)$$

Next, in step S2, an imaging contrast distribution C(j, i) is generated according to Formula (6A) using a low luminance threshold value $Y_{min}$, a maximum contrast threshold value $C_{max}$, and an exponent γ. If an imaging luminance signal Y(j, i) is less than a low luminance threshold value $Y_{min}$ in the first row of Formula (6A), a value of the imaging contrast distribution C(j, i) is set to 0. If the normalized imaging high-frequency signal dZ(j, i) is greater than a maximum contrast threshold value $C_{max}$ in the third row of Formula (6A), the value of the imaging contrast distribution C(j, i) is set to 1. Otherwise, the imaging contrast distribution C(j, i) is set to a value obtained by normalizing the normalized imaging high-frequency signal dZ(j, i) by the maximum contrast threshold value $C_{max}$ and obtaining the normalized imaging high-frequency signal dZ(j, i) raised to the power of γ in the second row of Formula (6A). Likewise, the $k^{th}$ viewpoint contrast distribution $C_k$(j, i) (k=1 to $N_{LF}$) is generated according to Formula (6B).

$$C(j,i) = \begin{cases} 0 & (Y(j,i) < Y_{min}), \\ (dZ(j,i)/C_{max})^\gamma & (dZ(j,i) \le C_{max}), \\ 1 & (dZ(j,i) > C_{max}). \end{cases} \quad (6A)$$

$$C_k(j,i) = \begin{cases} 0 & (Y(j,i) < Y_{min}), \\ (dZ_k(j,i)/C_{max})^\gamma & (dZ_k(j,i) \le C_{max}), \\ 1 & (dZ_k(j,i) > C_{max}). \end{cases} \quad (6B)$$

As described above, the imaging contrast distribution C(j, i) has a value within a range of [0, 1] (a value greater than or equal to 0 and less than or equal to 1). The contrast is indicated as being decreased when a value of C(j, i) is close to 0 and increased when the value of C(j, i) is close to 1. To adjust the tone curve from 0 to 1 of the imaging contrast distribution C(j, i), a value of a ratio between the normalized high-frequency signal and the maximum contrast threshold value raised to the power of γ is calculated. In order to alleviate a change at a low contrast side and steepen a change at a high contrast side, the exponent γ is desirably greater than or equal to 1.5 and less than or equal to 2.5. When necessary, a composite function F(C(j, i)) may serve as an image contrast distribution using a function F: [0.1]→[0.1] from a domain [0, 1] to a range [0, 1].

Figure 10:
FIG. 10 is a diagram illustrating an example of an imaging contrast distribution of the captured image.
Figure 11:
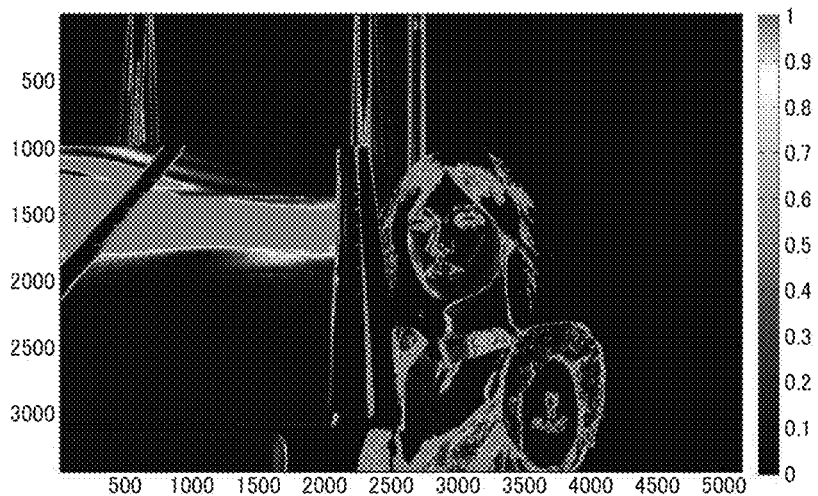
FIG. 11 is a diagram illustrating an example of a first viewpoint contrast distribution of a first viewpoint image.
Figure 12:
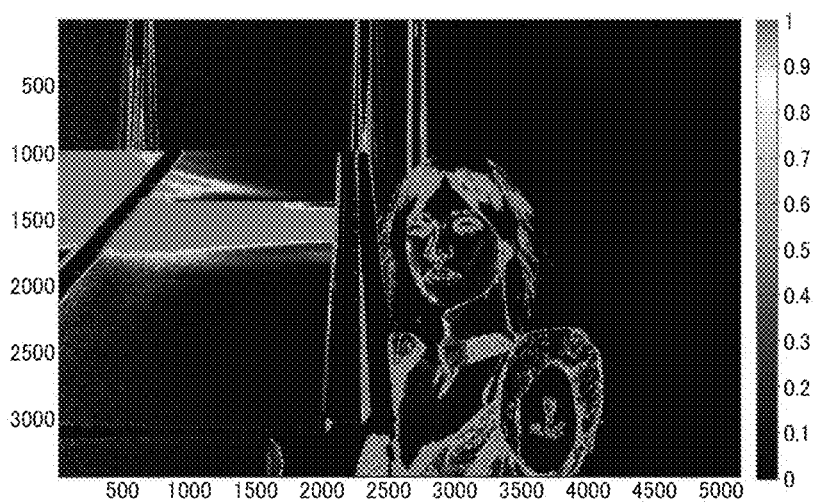
FIG. 12 is a diagram illustrating an example of a second viewpoint contrast distribution of a second viewpoint image.

A distribution example of the imaging contrast distribution C(j, i) of the present embodiment is illustrated in FIG. 10. Also, a distribution example of a first viewpoint contrast distribution $C_1$(j, i) is illustrated in FIG. 11, and a distribution example of a second viewpoint contrast distribution $C_2$(j, i) is illustrated in FIG. 12. In the distribution examples illustrated in FIGS. 10 to 12, a high/low index of the contrast is indicated by a gray scale of a range of [0, 1] on the right side. A white part in the vicinity of 1 indicates an area in which the number of high-frequency components of the spatial frequency of the x-axis direction is large and the contrast is high. Also, a black part in the vicinity of 0 indicates an area in which the number of high-frequency components of the spatial frequency of the x-axis direction is small and the contrast is low.

Figure 13A:
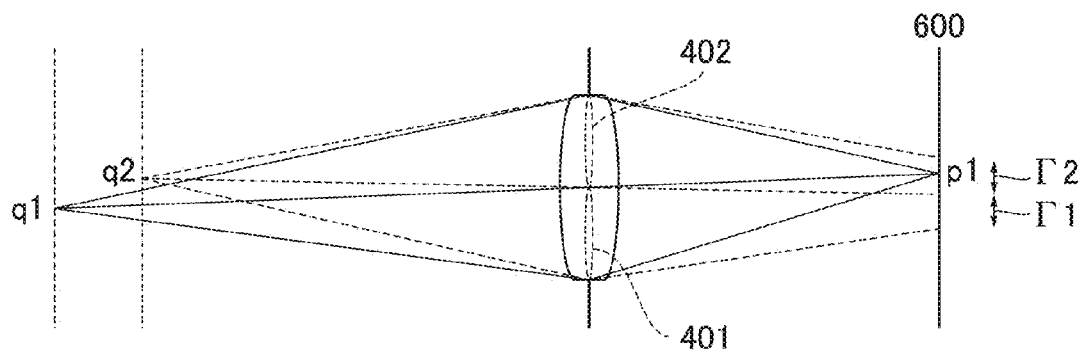
FIGS. 13A to 13C are schematic relationship diagrams of a parallax between viewpoint images and perspective conflict.
Figure 13B:
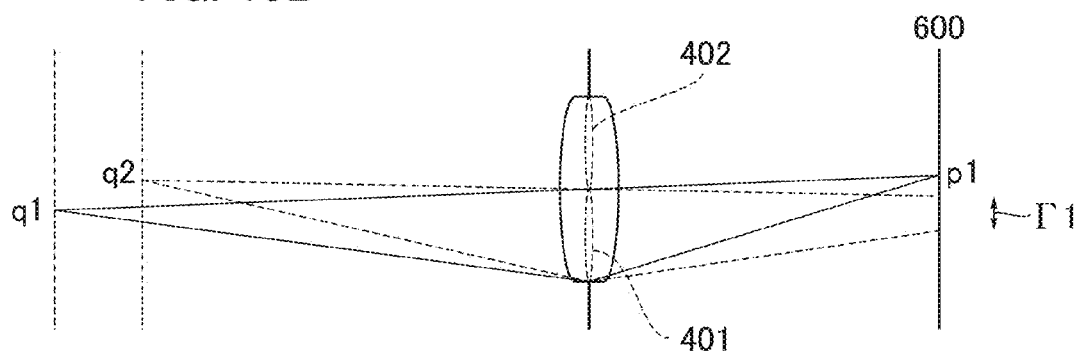
Figure 13C:
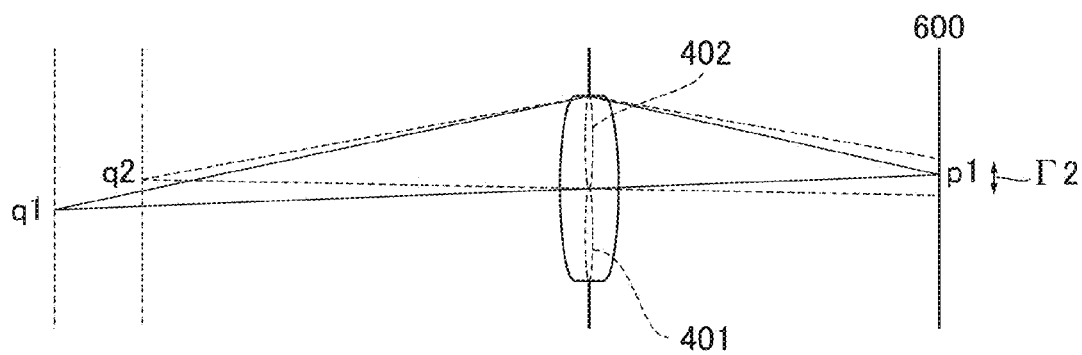

A relationship between a parallax between a first viewpoint image and a second viewpoint image as a plurality of viewpoint images in the present embodiment and perspective conflict or occlusion will be described using FIGS. 13A to 13C. In FIGS. 13A to 13C, an imaging element (not illustrated) of the present embodiment is arranged in an imaging plane 600, and the exit pupil of the image forming optical system is divided into two pupil part areas, i.e., the pupil part area 401 and the pupil part area 402.

FIG. 13A is an example in which photographing is performed by superimposing a blurred image Γ1+Γ2 of a front-side object q2 with a focus image p1 of an object q1 and perspective conflict occurs in a captured image. In this example, a light beam passing through the pupil part area 401 of the image forming optical system and a light beam passing through the pupil part area 402 are divided and illustrated in FIGS. 13B and 13C, respectively.

In FIG. 13B, the light beam from the object q1 passes through the pupil part area 401 and image formation is performed in an image p1 in a focused state, a light beam from a front-side object q2 passes through the pupil part area 401 and spreads to a blurred image Γ1 in a defocused state, and light is received in a sub-pixel 201 of each pixel of the imaging element. A first viewpoint image is generated from a light reception signal of the sub-pixel 201. In the first viewpoint image, the image p1 of the object q1 and the blurred image Γ1 of the front-side object q2 are captured at different positions without overlapping each other. FIG. 13B is an example in which perspective conflict or occlusion does not occur among a plurality of objects (the object q1 and the object q2) in the first viewpoint image.

On the other hand, in FIG. 13C, the light beam from the object q1 passes through the pupil part area 402 and image formation is performed in an image p1 in the focused state. A light beam from the front-side object q2 passes through the pupil part area 402 and spreads to a blurred image Γ2 in the defocused state and light is received in the sub-pixel 202 of each pixel of the imaging element. A second viewpoint image is generated from a light reception signal of the sub-pixel 202. In the second viewpoint image, the image p1 of the object q1 and the blurred image Γ2 of the front-side object q2 overlap and are captured. FIG. 13C is an example in which perspective conflict or occlusion occurs among a plurality of objects (the object q1 and the object q2) in the second viewpoint image.

In the example of FIGS. 13A to 13C, a state in which perspective conflict or occlusion occurs in the first viewpoint image and the second viewpoint image constituting the captured image in the vicinity of an area in which perspective conflict or occlusion occurs in the captured image is different. That is, this indicates that a possibility of a large difference between the first viewpoint image and the second viewpoint image is high. Therefore, it is possible to estimate an area having a high possibility of occurrence of perspective conflict or occlusion by detecting an area of a large difference among the plurality of viewpoint images.

Figure 14:
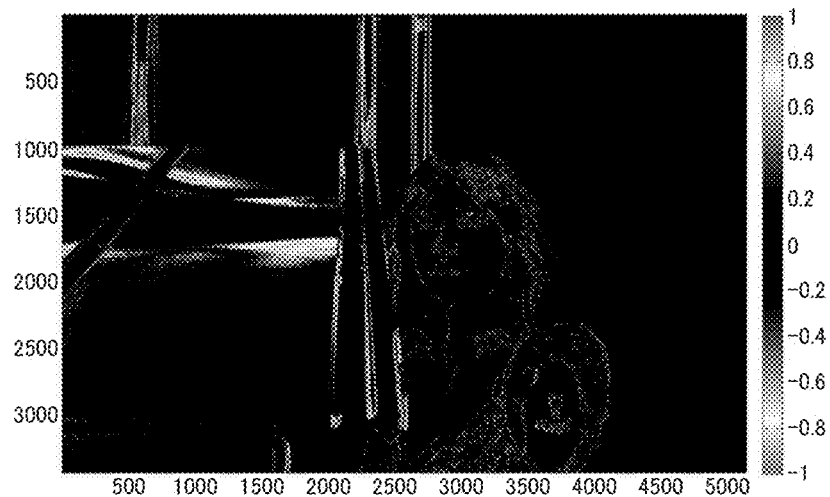
FIG. 14 is a diagram illustrating contrast difference amount distributions of a first viewpoint image and a second viewpoint image.

An example of a difference amount distribution $C_1$(j, i)–$C_2$(j, i) between a first viewpoint contrast distribution $C_1$(j, i) and a second viewpoint contrast distribution $C_2$(j, i) of the present embodiment is illustrated in FIG. 14. In the distribution example illustrated in FIG. 14, an index of a magnitude for a difference between the contrast of the first viewpoint image and the contrast of the second viewpoint image is indicated by a gray scale indication of a range of [−1, 1] on the right side. This contrast difference corresponds to a difference amount between the first viewpoint contrast distribution and the second viewpoint contrast distribution. A black portion close to 0 indicates an area in which the contrast difference between the first viewpoint image and the second viewpoint image is small. On the other hand, a white portion close to ±1 indicates an area in which the contrast difference between the first viewpoint image and the second viewpoint image is large.

In FIG. 14, as the area in which the contrast difference between the first viewpoint image and the second viewpoint image is large, an area in which perspective conflict or occlusion occurs in the body of the main object (the doll) and the plate of the checkered pattern is detected in the bottom center. Also, in addition to the area in which the perspective conflict or the occlusion occurs, an area in which a high-frequency band component of the spatial frequency is significantly changed is detected in the first viewpoint image and the second viewpoint image. For example, as in the object edge portion of the defocused state, an area in which the high-frequency band component of the spatial frequency is significantly changed is detected in the first viewpoint image and the second viewpoint image, such as an area in which the image shift amount is large in a state in which a high contrast is maintained. In these detection areas, an object image having a large difference in the spatial frequency component is captured in the first viewpoint image and the second viewpoint image. Thus, in a captured image obtained by integrating the first viewpoint image and the second viewpoint image, their detection areas are areas in which a plurality of object images having a large difference in the spatial frequency component are mixed.

When image processing, such as sharpening or smoothing, is strongly performed in the area in which a plurality of object images having different spatial frequency components are mixed, image quality may be degraded. Therefore, in the present embodiment, the area in which a plurality of object images having different spatial frequency components are mixed is detected using an absolute value $|C_1(j, i)-C_2(j, i)|$ of the difference amount distribution between the first viewpoint contrast distribution $C_1(j, i)$ and the second viewpoint contrast distribution $C_2(j, i)$. The image processing, such as sharpening or smoothing, is suppressed and is performed in the detected mixed area. Thereby, it is possible to perform image processing, such as sharpening or smoothing, while maintaining good image quality.

In the present embodiment, next, the contrast difference amount distribution is generated to detect the area in which the plurality of object images having different spatial frequency components are mixed in step S2 of FIG. 7. In detail, the contrast difference amount distribution $C_{DIFF}(j, i)$ is generated according to Formula (7A) from the first viewpoint contrast distribution $C_1(j, i)$ and the second viewpoint contrast distribution $C_2(j, i)$. Next, according to Formula (7B), an arithmetic process of multiplying the imaging contrast distribution $C(j, i)$ by the contrast difference amount distribution $C_{DIFF}(j, i)$ is performed. Thereby, a contrast distribution $M_{CON}(j, i)$ in which a value of the area, in which the plurality of object images having the different spatial frequency components are mixed, is suppressed to be close to 0, is generated.

$$C_{DIFF}(j,i)=1-|C_1(j,i)-C_2(j,i)|, \quad (7A)$$

$$M_{CON}(j,i)=C(j,i) \times C_{DIFF}(j,i). \quad (7B)$$

The contrast difference amount distribution $C_{DIFF}(j, i)$ is a distribution of a range of [0, 1] and is close to a value of 0 in an area in which the contrast difference between viewpoint images is large and mixing of object images having different spatial frequency components is great. Also, $C_{DIFF}(j, i)$ is a distribution close to a value of 1 in an area in which the contrast difference between the viewpoint images is small and mixing of object images having different spatial frequency components is small. A contrast distribution $M_{CON}(j, i)$ is a distribution in which the contrast difference amount distribution $C_{DIFF}(j, i)$ is combined with the imaging contrast distribution $C(j, i)$. Consequently, the distribution is a distribution in which a value of the area, in which the plurality of object images having the different spatial frequency components are mixed, is suppressed to be close to 0.

Figure 15:
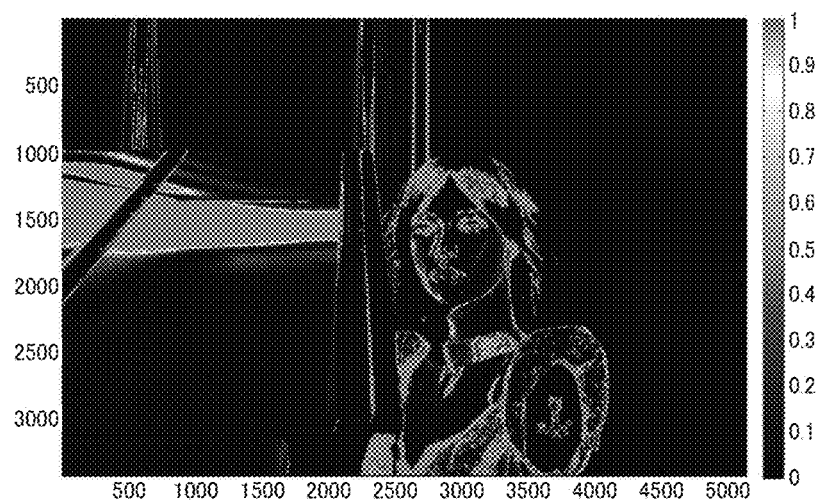
FIG. 15 is a diagram illustrating an example of a contrast distribution.

A distribution example of the contrast distribution $M_{CON}(j, i)$ of the present embodiment is illustrated in FIG. 15. In the distribution example illustrated in FIG. 15, a high/low index of the contrast is indicated by a gray scale indication of a range of [0, 1] on the right side. A white part in the vicinity of 1 indicates an area in which the number of high-frequency components of the spatial frequency of the x-axis direction is large and the contrast is high. Also, a black part in the vicinity of 0 indicates an area in which the number of high-frequency components of the spatial frequency of the x-axis direction is small and the contrast is low. The contrast value is suppressed in an area in which an absolute value $|C_1(j, i)-C_2(j, i)|$ of the difference amount distribution between the first viewpoint contrast distribution $C_1(j, i)$ and the second viewpoint contrast distribution $C_2(j, i)$ is large with respect to the imaging contrast distribution $C(j, i)$ illustrated in FIG. 10.

In the present embodiment, a monotonically decreasing linear function is used for the absolute value $|C_1(j, i)-C_2(j, i)|$ of the difference amount distribution between the first viewpoint contrast distribution and the second viewpoint contrast distribution as the contrast difference amount distribution $C_{DIFF}(j, i)$. The present invention is not limited thereto, however, and a more general function may be used when necessary.

As described above, in the present embodiment, the contrast distribution $M_{CON}(j, i)$ is generated as a composite contrast distribution according to a contrast difference for each viewpoint image from the captured image and the plurality of viewpoint images. In the contrast distribution of the present embodiment, an area in which a difference between contrasts of each viewpoint image is small is greater than an area in which a difference between contrasts is large. Also, in the contrast distribution of the present embodiment, an area in which the number of spatial frequency components of the captured image in a predetermined spatial frequency band is large is greater than an area in which the number of spatial frequency components is small. Also, in the contrast distribution of the present embodiment, an area in which the luminance of the captured image is high is greater than an area in which the luminance of the captured image is low.

In second and subsequent processes, for example, a process of recording distribution data is executed to omit the generation of the contrast distribution $M_{CON}(j, i)$ and shorten a processing time. That is, a process of recording the generated contrast distribution $M_{CON}(j, i)$ in a recording medium, such as a flash memory, in association with recorded image data is performed and distribution data is referred to when necessary.

Image Shift Amount Distribution

In step S3 of FIG. 7, an image shift amount distribution is generated on the basis of a correlation between two viewpoint images (a degree of signal matching) from the first viewpoint image and the second viewpoint image (a plurality of viewpoint images) at each position (j, i) at which a value of the contrast distribution $M_{CON}(j, i)$ is greater than or equal to a predetermined value. Also, the present invention is not limited thereto, and the image shift amount distribution may be generated on the basis of each viewpoint image regardless of a value of the contrast distribution $M_{CON}(j, i)$.

In step S3, a one-dimensional band-pass filtering process is first performed on a first viewpoint luminance signal $Y_1$ generated according to Formula (3B) from a first viewpoint image $I_1$ that is an RGB signal of a Bayer array in a pupil division direction (a column direction). Thereby, a first focus detection signal dYA is generated. Also, a one-dimensional band-pass filtering process is performed on a second viewpoint luminance signal $Y_2$ generated according to Formula (3B) from a second viewpoint image $I_2$ in the pupil division direction (the column direction). Thereby, a second focus detection signal dYB is generated. As the one-dimensional band-pass filter, for example, a one-dimensional differential filter [1, 5, 8, 8, 8, 8, 5, 1, −1, −5, −8, −8, −8, −8, −5, −1] or the like can be used. When necessary, a pass band of the one-dimensional band-pass filter may be adjusted.

In step S3, a correlation amount is calculated at each position (j, i) at which a value of the contrast distribution $M_{CON}(j, i)$ is greater than or equal to a predetermined value (for example 0.2). A process of relatively shifting the first focus detection signal dYA and the second focus detection signal dYB in the pupil division direction (the column direction) and calculating a correlation amount indicating a degree of signal matching is executed. An image shift amount distribution $M_{DIS}(j, i)$ is generated on the basis of a correlation amount. On the other hand, each position (j, i) at which a value of the contrast distribution $M_{CON}(j, i)$ is less than the predetermined value (for example 0.2) is excluded from the calculation of the image shift amount. It is possible to increase the precision of detection of the image shift amount and increase the speed of processing by limiting the detection of the image shift amount to an area in which perspective conflict or occlusion does not occur with a high contrast.

A first focus detection signal that is $j_2^{th}$ ($-n_2 \le j_2 \le n_2$) in the row direction around the position (j, i) and is $i_2^{th}$ ($-m_2 \le i_2 \le m_2$) in the column direction that is a pupil division direction is denoted by $dYA(j+j_2, i+i_2)$, and a second focus detection signal is denoted by $dYB(j+j_2, i+i_2)$. Using a shift amount as s ($-n_s \le s \le n_s$), the correlation amount at each position (j, i) is denoted by $COR_{even}(i, j, s)$ and $COR_{odd}(i, j, s)$. The correlation amount $COR_{even}(i, j, s)$ is calculated according to Formula (8A) and the correlation amount $COR_{odd}(i, j, s)$ is calculated according to Formula (8B).

$$COR_{even}(j, i, s) = \sum_{j_2=-n_2}^{n_2} \sum_{i_2=-m_2}^{m_2} |dYA(j+j_2, i+i_2+s) - dYB(j+j_2, i+i_2-s)| \quad (8A)$$

$$COR_{odd}(j, i, s) = \sum_{j_2=-n_2}^{n_2} \sum_{i_2=-m_2}^{m_2} |dYA(j+j_2, i+i_2+s) - dYB(j+j_2, i+i_2-1-s)| \quad (8B)$$

The correlation amount $COR_{odd}(j, i, s)$ is a correlation amount obtained by shifting shift amounts of the first focus detection signal dYA and the second focus detection signal dYB by (half phase—1) with respect to the correlation amount $COR_{even}(i, j, s)$.

An average value is calculated by calculating a shift amount of a real value in which the correlation amount is a minimum value according to each sub-pixel calculation from the correlation amount $COR_{even}(i, j, s)$ and the correlation amount $COR_{odd}(i, j, s)$, and an image shift amount distribution $M_{DIS}(j, i)$ is generated. In an area in which a value of the contrast distribution $M_{CON}(j, i)$ is less than the predetermined value (for example, 0. 2), the image shift amount distribution $M_{DIS}(j, i)$ is excluded from the calculation of the image shift amount, for example, $M_{DIS}(j, i)=0$. When necessary, a value other than 0 may be set.

Figure 16:
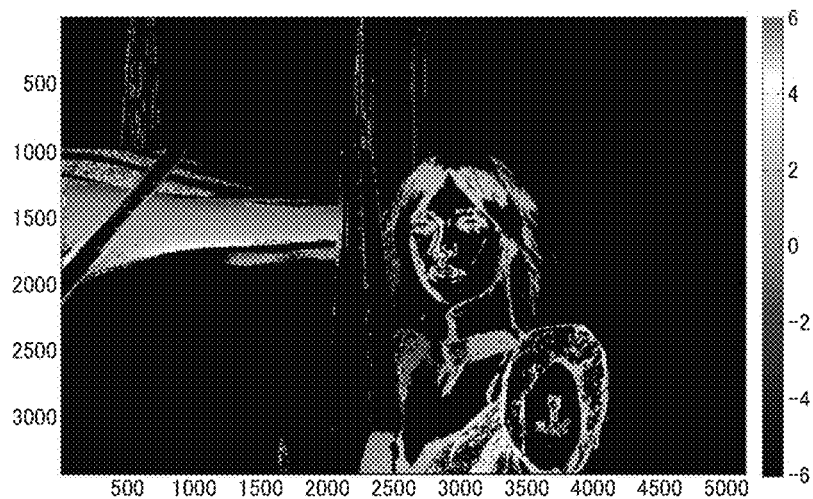
FIG. 16 is a diagram illustrating examples of image shift amount distributions of the first viewpoint image and the second viewpoint image.

A distribution example of an image shift amount distribution $M_{DIS}(j, i)$ of the present embodiment is illustrated in FIG. 16. A gray scale indication of a range of [−6, 6] is illustrated on the right side. In FIG. 16, an image shift amount between the first viewpoint image and the second viewpoint image is indicated in units of pixels by a gray scale indication in an area in which an image shift amount is calculated when the value of the contrast distribution $M_{CON}(j, i)$ is greater than or equal to a predetermined value 0.2. A portion of a black side of minus (−) indicates a front focus state and a portion in the vicinity of 0 indicates an area near the focus. A portion of a white side of plus (+) indicates a rear focus state. In addition, in the display of the distribution example of FIG. 16, a value of the contrast distribution $M_{CON}(j, i)$ is excluded from the calculation of the image shift amount when the value is less than the predetermined value 0.2. That is, an area in which $M_{DIS}(j, i)=0$ is set is indicated in a black color.

As described above, in the present embodiment, the image shift amount distribution $M_{DIS}(j, i)$ is generated from a plurality of viewpoint images. In second and subsequent processes, for example, a process of recording the generated image shift amount distribution $M_{DIS}(j, i)$ is executed to omit the generation of the image shift amount distribution $M_{DIS}(j, i)$ and shorten a processing time. That is, the image shift amount distribution data is recorded in a recording medium, such as a flash memory, in association with recorded image data. When necessary, conversion into the defocus amount distribution indicating a distribution of a defocus amount of the object within the viewpoint image may be performed by multiplying the image shift amount distribution $M_{DIS}(j, i)$ by a conversion coefficient according to a position (j, i), an aperture value of an imaging lens (an image forming optical system), an exit pupil distance, or the like.

Image Shift Different Amount Distribution

In step S4 of FIG. 7, a process of generating the image shift difference amount distribution $M_{DIFF}(j, i)$ from the image shift amount distribution $M_{DIS}(j, i)$ and the predetermined image shift amount is executed. In step S4, an image shift amount desired to be corrected by the refocus process of the present embodiment is first set as the predetermined image shift amount p. For example, in the example of the image shift amount distribution $M_{DIS}$ of FIG. 16, an image shift amount in the area near the eye is about 2.5. In the refocus process, if an image shift amount in an area near an eye of the main object (the doll) is desired to be finely corrected to generally 0, a predetermined image shift amount is set to p=2.5.

Next, in step S4, the image shift difference amount distribution $M_{DIFF}(j, i)$ is calculated according to Formula (9) from the image shift amount distribution $M_{DIS}(j, i)$, the predetermined image shift amount p, and the contrast distribution $M_{CON}(j, i)$ using $\sigma_p > 0$.

$$M_{DIFF}(j, i) = \left(1 - \frac{|M_{DIS}(j, i) - p|}{\sigma_p}\right) \times M_{CON}(j, i) \quad (9)$$

The image shift difference amount distribution $M_{DIFF}(j, i)$ is a distribution in which linear functions, in which there is monotonic decrease of an absolute value $|M_{DIS}(j, i)-p|$ of a difference between the image shift amount distribution $M_{DIS}(j, i)$ and the predetermined image shift amount p and the contrast distribution $M_{CON}(j, i)$, are combined. The image shift difference amount distribution $M_{DIFF}(j, i)$ is positive for $|M_{DIS}(j, i)-p|<\sigma_p$, is 0 for $|M_{DIS}(j, i)-p|=\sigma_p$, and is negative for $|M_{DIS}(j, i)-p|>\sigma_p$.

In an area in which the value of the contrast distribution $M_{CON}(j, i)$ is less than the predetermined value (for example, 0.2) and is excluded from the calculation of the image shift amount, $M_{DIFF}(j, i)=(1-|p|/\sigma_p)\times M_{CON}(j, i)$. When necessary, another value may be set.

Figure 17:
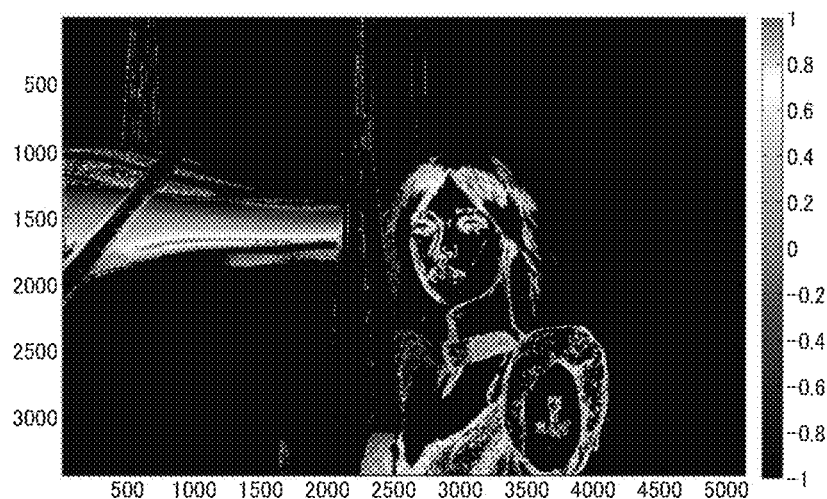
FIG. 17 is a diagram illustrating an image shift difference amount distribution from a predetermined shift amount.

A distribution example of an image shift difference amount distribution $M_{DIFF}(j, i)$ of the present embodiment is illustrated in FIG. 17. A gray scale indication of a range of [−1, 1] on the right side is shown. In the area in which the image shift amount is calculated when the value of the contrast distribution $M_{CON}$ is greater than or equal to a predetermined value 0.2, an image shift difference amount is indicated by the gray scale indication. A portion of a white side of a plus (+) sign indicates an area in which the absolute value $|M_{DIS}(j, i)-p|$ between the image shift amount distribution $M_{DIS}(j, i)$ and the predetermined image shift amount p is small and the contrast is high. A portion of a white side of a minus (−) sign indicates an area in which the absolute value $|M_{DIS}(j, i)-p|$ between the image shift amount distribution $M_{DIS}(j, i)$ and the predetermined image shift amount p is large and the contrast is high. Also, in the display of the distribution example of FIG. 17, a value of the contrast distribution $M_{CON}(j, i)$ is less than the predetermined value 0.2 and is excluded from the calculation of the image shift amount. That is, an area in which $M_{DIFF}(j, i)=(1-|p|/\sigma_p)\times M_{CON}(j, i)$ is set is indicated in a black color.

Corrected Viewpoint Image

In step S5 of FIG. 7, processes of first sharpening and first smoothing are performed on the first viewpoint image and the second viewpoint image (first to $N_{LF}^{th}$ viewpoint images) according to the image shift difference amount distribution $M_{DIFF}(j, i)$. A first corrected viewpoint image and a second corrected viewpoint image (first to $N_{LF}^{th}$ corrected viewpoint images) are generated.

In the present embodiment, a (crosstalk correction, first sharpening) process of enlarging a difference between viewpoint images and sharpening a parallax in an area in which the image shift difference amount distribution is greater than or equal to 0 ($M_{DIFF}(j, i)\geq 0$) with respect to the first viewpoint image and the second viewpoint image (a plurality of viewpoint images) is performed. On the other hand, in an area in which the image shift difference amount distribution is less than 0 ($M_{DIFF}(j, i)<0$), a (crosstalk correction, first smoothing) process of smoothing the parallax by reducing the difference between the viewpoint images is performed. According to the above-described process, the first corrected viewpoint image and the second corrected viewpoint image (the plurality of corrected viewpoint images) are generated.

In step S5 of FIG. 7, the strength of the (crosstalk correction, first sharpening) process of enlarging a difference between viewpoint images with respect to the first viewpoint image and the second viewpoint image (the plurality of viewpoint images) and sharpening a parallax is first set. A first strength parameter for designating the strength of the present process is denoted by $k_{ct}$ and $k_{ct}\geq 0$. Alternatively, the strength parameter $k_{ct}\geq 0$ for designating the strength of the (crosstalk correction, first smoothing) process of smoothing the parallax by reducing the difference between the viewpoint images is set as the first strength parameter.

Next, in step S5, the first strength parameter distribution $K_{ct}(j, i)$ is set according to Formula (10). The first strength parameter distribution $K_{ct}(j, i)$ is proportional to the image shift difference amount distribution $M_{DIFF}(j, i)$ using $k_{ct}$ as a proportional coefficient.

$$K_{ct}(j,i)=k_{ct}\times M_{DIFF}(j,i), \qquad (10)$$

Next, in step S5, arithmetic processes of Formula (11A) and Formula (11B) are performed with respect to the first viewpoint image $I_1(j, i)$ and the second viewpoint image $I_2(j, i)$ (first to $N_{LF}^{th}$ viewpoint images). A first corrected viewpoint image $MI_1(j, i)$ and a second corrected viewpoint image $MI_2(j, i)$ (first to $N_{LF}^{th}$ corrected viewpoint images) are generated.

$$\begin{pmatrix} MI_1(j,i) \\ MI_2(j,i) \end{pmatrix} = \begin{pmatrix} 1+K_{ct}(j,i) & -K_{ct}(j,i) \\ -K_{ct}(j,i) & 1+K_{ct}(j,i) \end{pmatrix} \begin{pmatrix} I_1(j,i) \\ I_2(j,i) \end{pmatrix}, \qquad (11A)$$

$(K_{ct}(j, i) \geq 0)$, $$\begin{pmatrix} MI_1(j,i) \\ MI_2(j,i) \end{pmatrix} = \begin{pmatrix} \dfrac{1-K_{ct}(j,i)}{1-2K_{ct}(j,i)} & \dfrac{-K_{ct}(j,i)}{1-2K_{ct}(j,i)} \\ \dfrac{-K_{ct}(j,i)}{1-2K_{ct}(j,i)} & \dfrac{1-K_{ct}(j,i)}{1-2K_{ct}(j,i)} \end{pmatrix} \begin{pmatrix} I_1(j,i) \\ I_2(j,i) \end{pmatrix}, \qquad (11B)$$

$(K_{ct}(j, i) < 0)$.

The process of Formula (11A) is a process of sharpening a parallax by enlarging a difference between the first viewpoint image and the second viewpoint image in an area in which the first strength parameter distribution (the image shift difference amount distribution) is greater than or equal to 0 ($K_{ct}(j, i)=k_{ct}\times M_{DIFF}(j, i)\geq 0$). On the other hand, the process of Formula (11B) is a process of smoothing the parallax by reducing a difference between the first viewpoint image and the second viewpoint image in an area in which the first strength parameter distribution (the image shift difference amount distribution) is less than 0 ($K_{ct}(j, i)=k_{ct}\times M_{DIFF}(j, i)<0$).

Figure 18:
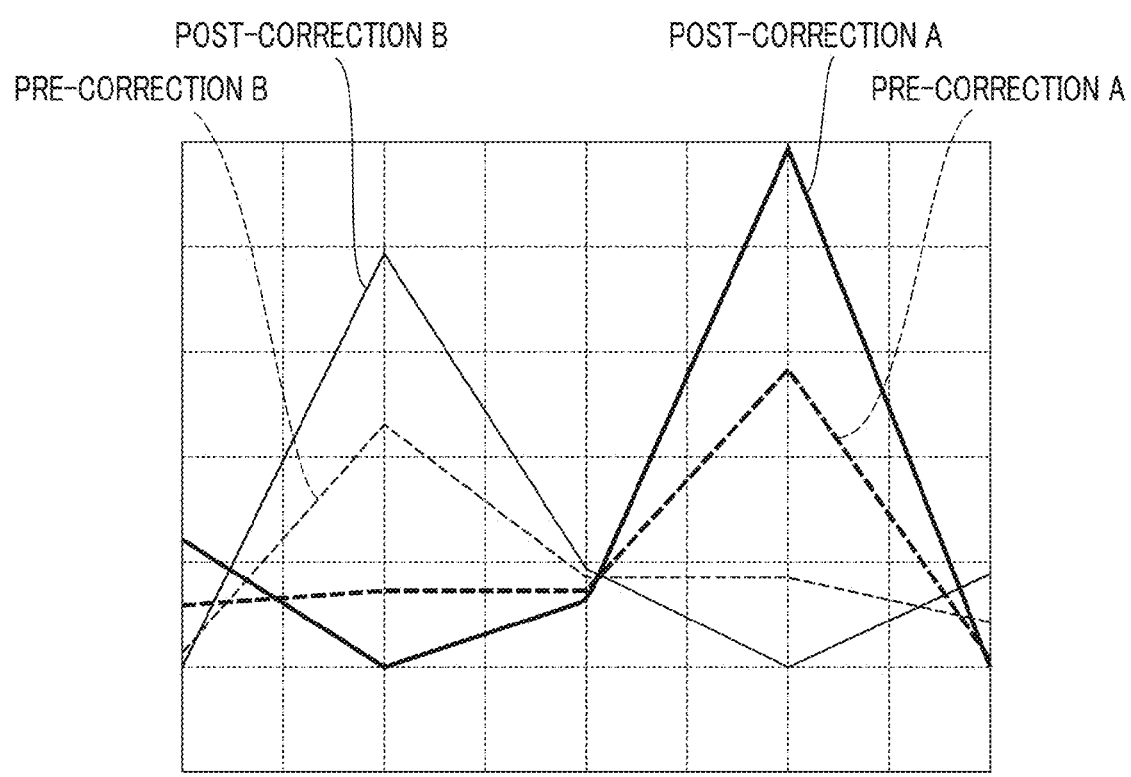
FIG. 18 is a diagram illustrating a (crosstalk correction) process of sharpening a parallax between viewpoint images.

FIG. 18 illustrates an example of a (crosstalk correction, first sharpening) process of sharpening a parallax by enlarging the difference between the first viewpoint image and the second viewpoint image in a graph. The horizontal axis represents a pixel position and the vertical axis represents a pixel value (a signal level). In FIG. 18, examples of a first viewpoint image (pre-correction A) and a second viewpoint image (pre-correction B) before the crosstalk correction and the first sharpening process are illustrated in a graph of a dotted line. Also, examples of a first corrected viewpoint image (post-correction A) and a second corrected viewpoint image (post-correction B) after the crosstalk correction and the first sharpening process according to Formula (11A) are illustrated in a graph of a solid line. In the (crosstalk correction, first sharpening) process of sharpening the parallax by enlarging the difference between the viewpoint images, a portion in which the difference between the viewpoint images is large before the process is further enlarged, but a portion in which the difference between the viewpoint images is small is hardly changed. As described above, it can be seen that the parallax between the viewpoint images is sharpened.

On the other hand, in the smoothing process (crosstalk correction, first smoothing) according to Formula (11B), a difference between the first viewpoint image and the second viewpoint image (the plurality of viewpoint images) is reduced and the parallax between the viewpoint images is smoothed.

In the present embodiment, as described above, image processing of sharpening and smoothing according to the contrast distribution and the image shift amount distribution is performed on a plurality of viewpoint images. The image processing according to the contrast distribution and the image shift amount distribution may be a sharpening process, the smoothing process, or a combined process thereof when necessary.

In the present embodiment, arithmetic processes of Formula (7A), Formula (7B), Formula (9), Formula (10), Formula (11A), and Formula (11B) are performed. The image processing, such as sharpening or smoothing, on each viewpoint image is more strongly performed in an area in which a difference between contrasts is small than in an area in which the difference between the contrasts is large for each viewpoint image. Also, the image processing, such as sharpening or smoothing, on each viewpoint image is more strongly performed in an area in which a contrast distribution is large than in an area in which the contrast distribution is small.

In the present embodiment, according to Formula (9), Formula (10), Formula (11A), and Formula (11B), a sharpening process is performed in an area in which a difference from the predetermined shift amount (reference) of the image shift amount distribution is small and a smoothing process is performed in an area in which the difference is large. According to Formula (9), Formula (10), and Formula (11A), the sharpening process is strongly performed in an area in which a difference from a predetermined shift amount of the image shift amount distribution is small than in an area in which the difference is large. Also, according to Formula (9), Formula (10), and Formula (11B), the smoothing process is strongly performed in an area in which a difference from a predetermined shift amount of the image shift amount distribution is large than in an area in which the difference is small.

Also, in the present embodiment, a process of sharpening a parallax by enlarging a difference among a plurality of viewpoint images for each pixel of the plurality of viewpoint images or a process of smoothing the parallax by reducing the difference among the plurality of viewpoint images is performed according to Formula (11A) and Formula (11B) and a plurality of corrected viewpoint images are generated. The first sharpening process of Formula (11A) and the second smoothing process of Formula (11B) are arithmetic processes between the first viewpoint image $I_1(j, i)$ and the second viewpoint image $I_2(j, i)$. A signal of the first viewpoint image $I_1(j, i)$ is an output signal of the first photoelectric conversion unit included in the pixel of each position $(j, i)$, and a signal of the second viewpoint image $I_2(j, i)$ is an output signal of the second photoelectric conversion unit included in the pixel of each position $(j, i)$.

Weight Coefficient

In step S6 of FIG. 7, a weight coefficient for each of a first corrected viewpoint image and a second corrected viewpoint image (first to $N_{LF}^{th}$ corrected viewpoint images) is set to finely correct a depth of field in a predetermined area.

In step S6, a predetermined area $R=[j_1, j_2]\times[i_1, i_2]$, in which the depth of field is desired to be re-corrected, and a boundary width $\sigma$ of the predetermined area are first set. According to Formula (12), a table function $T(j, i)$ according to the predetermined area R and the boundary width $\sigma$ of the predetermined area is calculated according to Formula (12).

$$T(j, i) = 0.5 * \left[\tanh\frac{(j-j_1)}{\sigma} - \tanh\frac{(j-j_2)}{\sigma}\right] \times \quad (12)$$
$$0.5 * \left[\tanh\frac{(i-i_1)}{\sigma} - \tanh\frac{(i-i_2)}{\sigma}\right].$$

In Formula (12), tan h denotes a hyperbolic tangent function. The table function $T(j, i)$ has 1 inside the predetermined area R and has 0 outside the predetermined area R. In the boundary width $\sigma$ of the predetermined area R, a value generally continuously changes from 1 to 0. When necessary, the predetermined area is a circular shape or may be any shape. Also, when necessary, a plurality of predetermined areas and boundary widths may be set.

Next, in step S6, a first weight coefficient $W_1(j, i)$ of the first corrected viewpoint image $MI_1(j, i)$ is calculated as a real coefficient w ($-1 \le w \le 1$) according to Formula (13A). Also, a second weight coefficient $W_2(j, i)$ of the second corrected viewpoint image $MI_2(j, i)$ is calculated according to Formula (13B).

$$W_1(j,i)=1-wT(j,i), \quad (13A)$$

$$W_2(j,i)=1+wT(j,i). \quad (13B)$$

If the depth of field is corrected by increasing an addition ratio of the first corrected viewpoint image $MI_1(j, i)$ in a predetermined area, the depth of field is set in a range of $-1 \le w<0$. Also, if the depth of field is corrected by increasing an addition ratio of the second corrected viewpoint image $MI_2(j, i)$, the depth of field is set in a range of $0<w \le 1$. When necessary, the depth of field may not be corrected by setting w=0 and $W_1 \equiv W_2 \equiv 1$.

Refocusing in Shift Synthesis Process

In step S7 of FIG. 7, a process (shift synthesis process) of multiplying each of a first corrected viewpoint image and a second corrected viewpoint image (first to $N_{LF}^{th}$ corrected viewpoint images) by a weight coefficient to relatively shift each of a first corrected viewpoint image and a second corrected viewpoint image (the first to $N_{LF}^{th}$ corrected viewpoint images) in the pupil division direction (the x-axis direction), and adding the shifted images is performed. An intermediate image that is a synthesized image from the plurality of viewpoint images is generated.

Figure 19:
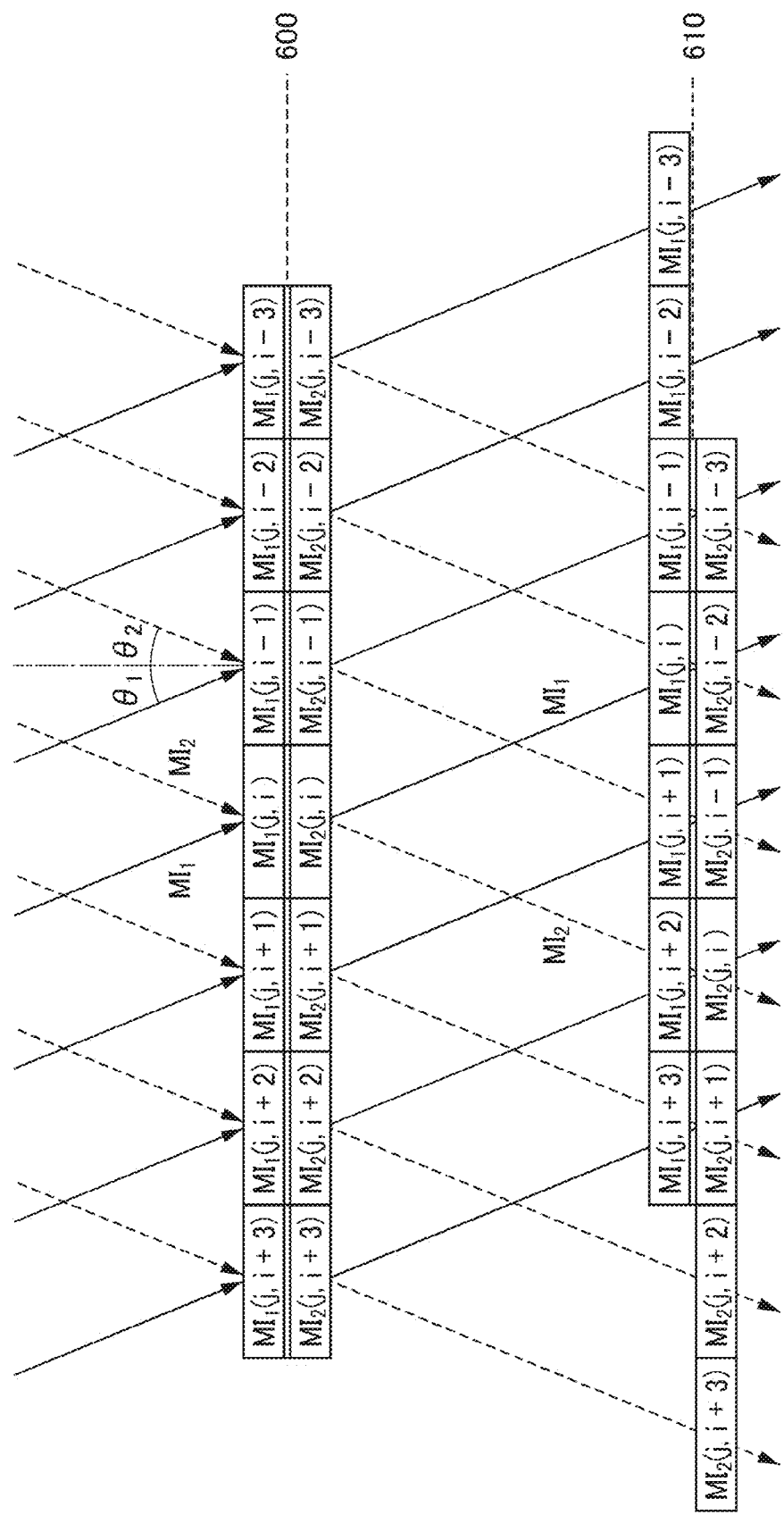
FIG. 19 is a schematic explanatory diagram of refocusing by a shift synthesis process.

FIG. 19 is an explanatory diagram illustrating an overview of refocusing in a shift synthesis process of the pupil division direction (the x-axis direction) based on the first corrected viewpoint image $MI_1(j, i)$ and the second corrected viewpoint image $MI_2(j, i)$ (the plurality of corrected viewpoint images). In FIG. 19, the down direction is defined as a positive direction of the x-axis by setting the x-axis in the up/down direction of the paper surface, the front side is defined as a positive direction of the y-axis by setting a direction perpendicular to the paper surface as the y-axis, and the left direction is defined as a positive direction of the z-axis by setting the z-axis in the left/right direction of the paper surface. An imaging plane 600 of FIG. 19 corresponds to the imaging plane 600 illustrated in FIGS. 13A to 13C.

In FIG. 19, the first corrected viewpoint image $MI_1(j, i)$ and the second corrected viewpoint image $MI_2(j, i)$ are schematically illustrated. A signal of the first corrected viewpoint image $MI_1(j, i)$ is a light reception signal of a light beam incident on the first photoelectric conversion unit 301 of the position $(j, i)$ at a main ray angle $\theta_1$ corresponding to a first pupil part area 401 of FIGS. 13A to 13C. A signal of the second corrected viewpoint image $MI_2(j, i)$ is a light reception signal of a light beam incident on the second photoelectric conversion unit 302 of the position (j, i) at a main ray angle $\theta_2$ corresponding to a second pupil part area 402 of FIGS. 13A to 13C. The first photoelectric conversion unit 301 and the second photoelectric conversion unit 302 (the first to $N_{LF}{}^{th}$ photoelectric conversion units) correspond to the first sub-pixel 201 and the second sub-pixel 202 (the first to $N_{LF}{}^{th}$ sub-pixels), respectively.

The first corrected viewpoint image $MI_1(j, i)$ and the second corrected viewpoint image $MI_2(j, i)$ (the plurality of corrected viewpoint images) have incident angle information as well as light intensity distribution information. It is possible, therefore, to generate a refocus image in a virtual image formation plane 610 in the following parallel movement and addition processes. A first process is a process of moving the first corrected viewpoint image $MI_1(j, i)$ to the virtual image formation plane 610 along the main ray angle $\theta_1$ in parallel, and moving the second corrected viewpoint image $MI_2(j, i)$ to the virtual image formation plane 610 along the main ray angle $\theta_2$ in parallel and a second process is a process of adding the first corrected viewpoint image $MI_1(j, i)$ and the second corrected viewpoint image $MI_2(j, i)$ moved in parallel.

Moving the first corrected viewpoint image $MI_1(j, i)$ to the virtual image formation plane 610 along the main ray angle $\theta_1$ in parallel corresponds to a shift of −1 pixel in the column direction. Also, moving the second corrected viewpoint image $MI_2(j, i)$ to the virtual image formation plane 610 along the main ray angle $\theta_2$ in parallel corresponds to a shift of +1 pixel in the column direction. It is possible, therefore, to generate a refocus signal in the virtual image formation plane 610 by relatively shifting the first corrected viewpoint image $MI_1(j, i)$ and the second corrected viewpoint image $MI_2(j, i)$ by +2 pixels and associating and adding $MI_1(j, i)$ and $MI_2(j, i+2)$).

In step S7 of FIG. 7, a process of generating a shift synthesis image $I_S(j, i)$ according to Formula (14) from the first corrected viewpoint image $MI_1(j, i)$ and the second corrected viewpoint image $MI_2(j, i)$ (the plurality of corrected viewpoint images) is performed. That is, a shifted synthesized image $I_S(j, i)$ that is a refocus image in a virtual image formation plane is generated. An even number closest to a predetermined image shift amount p is denoted by pe. Here, the even number pe closest to the predetermined image shift amount p is calculated according to pe=2× ROUND(p/2) using ROUND as a function for rounding-off.

$$I_S(j,i)=W_1(j,i)\times MI_1(j,i)+W_2(j,i)\times MI_2(j,i-pe). \quad (14)$$

In Formula (14), simultaneously with the shift addition, the first corrected viewpoint image $MI_1(j, i)$ is multiplied by a first weight coefficient distribution $W_1(j, i)$ of Formula (13A), and the second corrected viewpoint image $MI_2(j, i)$ is multiplied by a second weight coefficient distribution $W_2(j, i)$ of Formula (13B). Thereby, it is possible to correct a depth of field in a predetermined area. When necessary, the depth of field may not be corrected using $W_1 \equiv W_2 \equiv 1$. A shift synthesis process is performed by multiplying each of the plurality of viewpoint images by a weight coefficient, and an intermediate image that is a synthesized image from the plurality of viewpoint images is generated.

The shift synthesis process of the first corrected viewpoint image $MI_1(j, i)$ and the second corrected viewpoint image $MI_2(j, i)$ (the plurality of corrected viewpoint images) is not limited to an even number shift or an addition process. When necessary, a real number shift or a more general synthesis process may be used. Also, when necessary, the process of step S8 of FIG. 7, to be described below, may be omitted, and the shifted synthesized image $I_S(j, i)$ generated by shifting and adding the plurality of corrected viewpoint images according to Formula (14) may be an output image.

In the present embodiment, the number of pixels of the shifted synthesized image $I_S(j, i)$ generated according to Formula (14) is maintained at the same number as the number of pixels N of the captured image. Thus, a termination process of enlarging a data length is performed on a termination portion in the pupil division direction (the x-axis direction) of the second corrected viewpoint image $MI_2(j, i)$ in advance. If pe>0, a termination process is executed according to Formula (15A) for a termination column number $i_e$ ($i_{min} \le i_e \le i_{min}+pe-1$) using a minimum column number as $I_{min}$. If pe<0, a termination process is executed according to Formula (15B) for a termination column number $i_e$ ($i_{max}+pe+1 \le i_e \le i_{max}$) using a maximum column number as $I_{max}$. In the present embodiment, a process of extending an image size of the plurality of corrected viewpoint images is performed.

$$MI_1(j,i_e)=MI_2(j,i_{min}+pe+\mathrm{mod}(i_e-i_{min},2)),(pe>0), \quad (15A)$$

$$MI_2(j,i_e)=MI_2(j,i_{max}+pe-\mathrm{mod}(i_e-i_{max},2)),(pe<0), \quad (15B)$$

Refocusable Range

Figure 20:
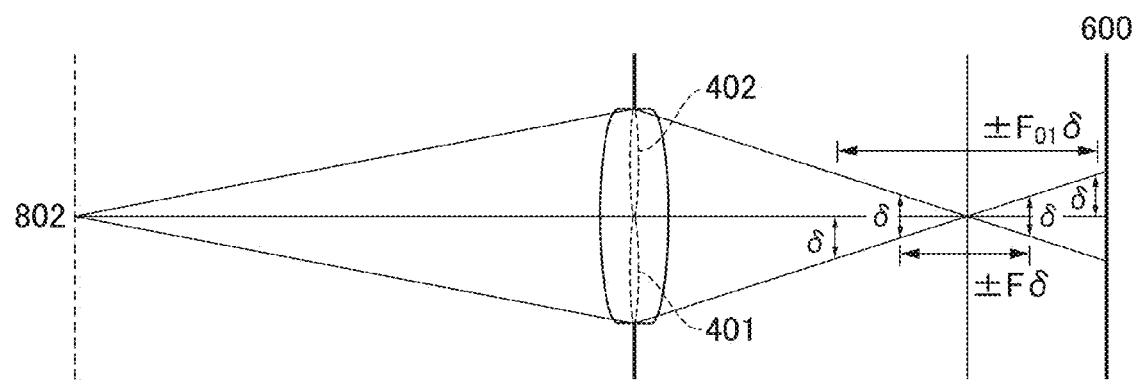
FIG. 20 is a schematic explanatory diagram of a range in which refocusing by the shift synthesis process is possible.

The refocusable range in the shift synthesis process in the present embodiment will be described with reference to a schematic diagram of FIG. 20. An imaging element (not illustrated) is arranged in the imaging plane 600. As in the case of FIGS. 13A to 13C, an exit pupil of the image forming optical system is divided into a first pupil part area 401 and a second pupil part area 402 according to (2×1) division.

When an allowable confusion circle diameter is denoted by $\delta$ and an aperture value of the image forming optical system is denoted by F, a depth of field in the aperture value F is $\pm F \times \delta$. On the other hand, an effective aperture value $F_{01}$ (or $F_{02}$) of the pupil division direction (the x-axis direction) of the pupil part area 401 (or 502) narrowed to be divided into $N_x \times N_y$ (for example, 2×1) becomes $F_{01}=N_x \times F$ (or $F_{02}=N_x \times F$) and it is darkening. The effective depth of field for each first corrected viewpoint image (or second corrected viewpoint image) is increased by a factor of $N_x$ in $\pm N_x \times F \times \delta$ and the focus range is increased by a factor of $N_x$. Within the range of the effective depth of field "$\pm N_x \times F \times \delta$," an object image focused for each first corrected viewpoint image (or second corrected viewpoint image) is acquired. Consequently, it is possible to refocus the focus position after photographing in a process of shifting the first corrected viewpoint image (or the second corrected viewpoint image) along the main ray angle $\theta_1$ (or $\theta_2$), illustrated in FIG. 19, in parallel, and adding the shifted first corrected viewpoint image (or second corrected viewpoint image).

A defocus amount d from the imaging plane 600, in which the focus position after the photographing can be refocused, is limited. The refocusable range of the defocus amount d is generally a range of Formula (16). The allowable confusion circle diameter $\delta$ is defined by $\delta=2\cdot\Delta X$ (a reciprocal of a Nyquist frequency $1/(2\cdot\Delta X)$ of a pixel cycle $\Delta X$) or the like.

$$|d| \le N_x \times F \times \delta \quad (16)$$

As illustrated in the pupil distribution example of FIG. 5B, however, in the pupil division by microlenses with a diameter of several micrometers and the photoelectric conversion unit divided into a plurality of parts formed for each pixel unit, the gradual pupil division is performed because of a diffraction blur due to the wave nature of light. Thus, even when the degree of focus depth in the pupil division direction (the x-axis direction) of the first viewpoint image and the second viewpoint image (the plurality of viewpoint images) is not sufficiently deep, and the refocus image is generated using the first viewpoint image and the second viewpoint image (the plurality of viewpoint images), a refocus effect may not be sufficiently obtained.

Therefore, in the present embodiment, the following process is performed on the first viewpoint image and the second viewpoint image (the plurality of viewpoint images) in refocusing in the shift synthesis process. A process of sharpening a parallax by enlarging a difference between the first viewpoint image and the second viewpoint image according to Formula (11A) for each pixel for which a first intensity parameter distribution (an image shift difference amount distribution) is greater than or equal to 0 ($K_{ct}$(j, i)=$k_{ct}$×$M_{DIFF}$(j, i)≥0) is performed. Therefore, the first corrected viewpoint image and the second corrected viewpoint image (the plurality of corrected viewpoint images) are generated. Thereby, it is possible to increase the effective aperture value F in the pupil division direction of the first corrected viewpoint image and the second corrected viewpoint image, to correct a degree of focus depth to be deeper, and to improve a refocus effect.

Figure 21A:
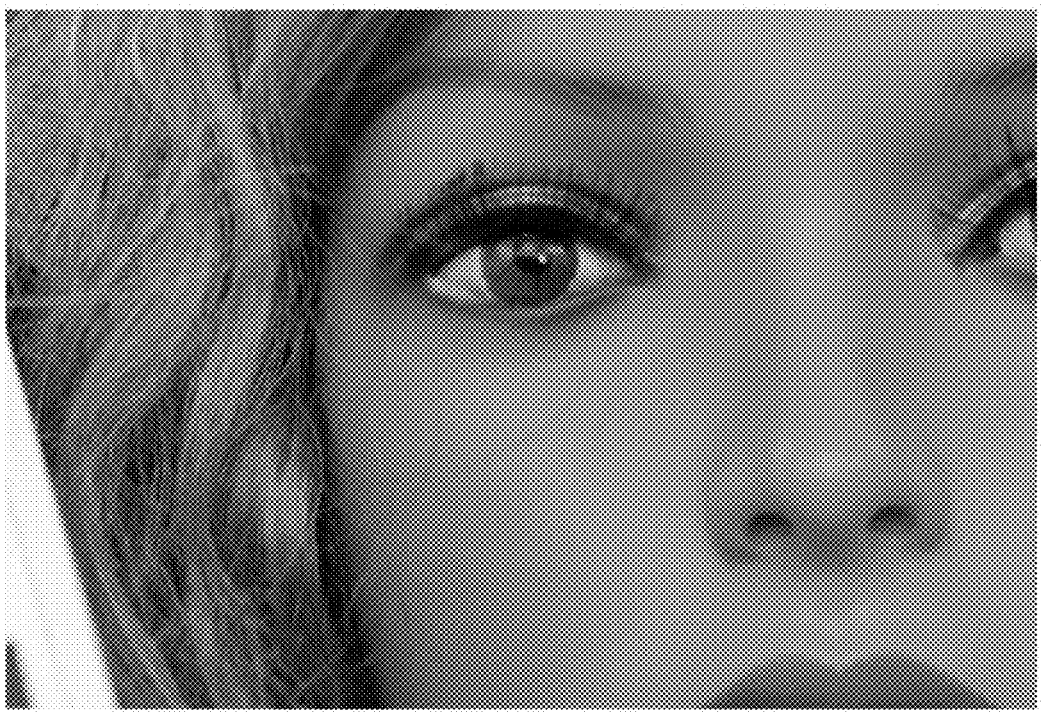
FIGS. 21A and 21B are diagrams illustrating refocused images in the conventional technology and technology of the present embodiment.

Hereinafter, an effect of a (crosstalk correction, first sharpening) process of sharpening the first viewpoint image and the second viewpoint image (the plurality of viewpoint images) in refocusing in the shift synthesis process will be described with reference to FIGS. 21A and 21B. FIG. 21A illustrates an example of a refocus image in the shift synthesis process of the first viewpoint image and the second viewpoint image before sharpening (crosstalk correction, first sharpening) in the conventional example.

For example, because the pupil division is gradual, the degree of focus depth in the pupil division direction (the x-axis direction) of the first viewpoint image and the second viewpoint image (the plurality of viewpoint images) is not sufficiently deep. Refocusing in the shift synthesis process is performed on a captured image of a rear focus state in which a focus is aligned behind a right eye of the main object (the doll), but a sufficient refocus effect is not obtained while the right eye, the eyelashes, the hair, or the like of the main object (the doll) is in a small blur state.

Figure 21B:
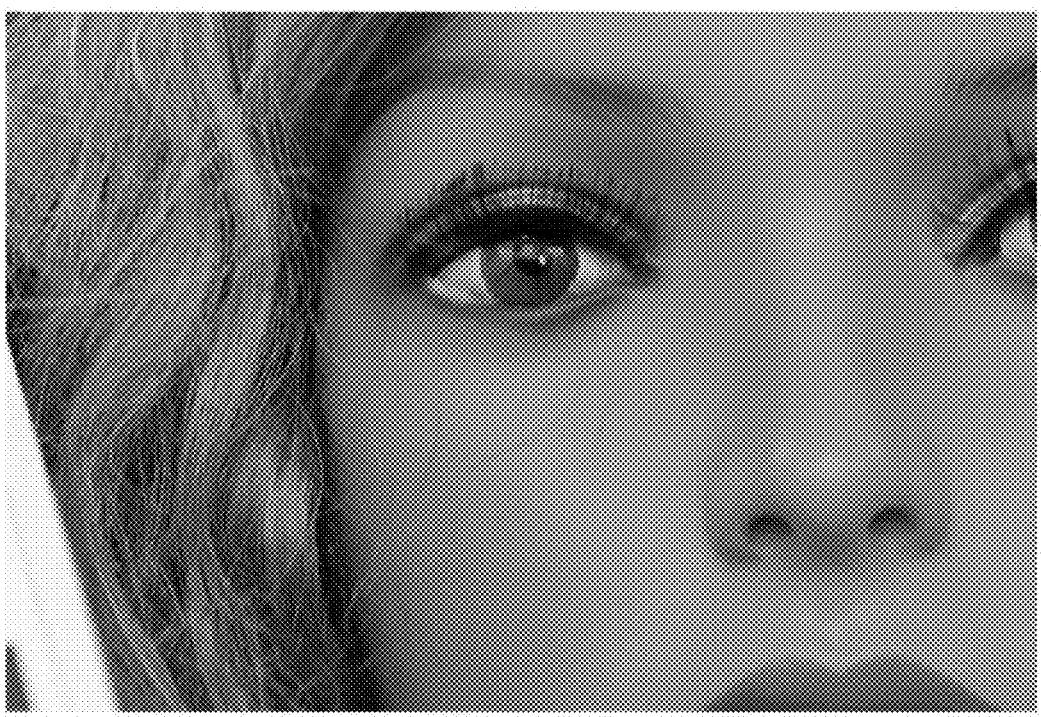

On the other hand, FIG. 21B illustrates an example of a refocus image in a shift synthesis process on the first corrected viewpoint image and the second corrected viewpoint image after sharpening (crosstalk correction, first sharpening) in the present embodiment. For example, in the process of sharpening a parallax by enlarging the difference between the first viewpoint image and the second viewpoint image, an effective aperture value F of the pupil division direction (the x-axis direction) of the first corrected viewpoint image and the second corrected viewpoint image (the plurality of corrected viewpoint images) increases and the degree of focus depth is corrected to be deeper. According to refocusing in the shift synthesis process, after photographing, a focus position aligned in the right eye, the eyelashes, the hair, or the like of the main object (the doll) is re-corrected and the refocus effect is improved.

Also, if the number of pupil divisions is small and the number of viewpoint images is small as in the present embodiment of two divisions in the pupil division direction (the x-axis direction) for $N_x$=2, $N_y$=1, and $N_{LF}$=2, the following problems may occur. That is, in an area in which a blur amount (an image shift amount) is increased in the refocusing in the shift synthesis process, a boundary of the object in which an artificial two-line blur is caused is doubly formed, and image quality may be degraded.

Therefore, in the present embodiment, the following process is performed on the first viewpoint image and the second viewpoint image (the plurality of viewpoint images) in the refocusing in the shift synthesis process. A process (a first smoothing process) of smoothing a parallax by reducing the difference between the first viewpoint image and the second viewpoint image according to Formula (11B) for each pixel for which a first intensity parameter distribution (an image shift difference amount distribution) is less than 0 ($K_{ct}$(j, i)=$k_{ct}$×$M_{DIFF}$(j, i)<0) is performed. Therefore, the first corrected viewpoint image and the second corrected viewpoint image (the plurality of corrected viewpoint images) are generated. Thereby, in an area in which a blur amount (an image shift amount) is increased, it is possible to perform refocusing in the synthesis process while suppressing the generation of the artificial two-line blur and maintaining good image quality.

Sharpness/Unsharpness Control

Processes of second sharpening and second smoothing are executed in step S8 of FIG. 7. A process of sharpening and smoothing according to the image shift difference amount distribution $M_{DIFF}$(j, i) is performed on a shifted synthesized image (an intermediate image) generated from the first corrected viewpoint image and the second corrected viewpoint image (the first to $N_{LF}^{th}$ corrected viewpoint images). According to this process, it is possible to generate an output image on which the sharpness/unsharpness control is performed to adaptively control an area in which the degree of sharpness is high and an area in which a degree of blur is high after photographing.

In the present embodiment, the second sharpening process is performed on the shifted synthesized image $I_S$(j, i) in an area in which the image shift difference amount distribution is greater than or equal to 0 ($M_{DIFF}$(j, i)≥0). On the other hand, the second smoothing process is performed in an area in which the image shift difference amount distribution is less than 0 ($M_{DIFF}$(j, i)<0). Therefore, an output image is generated.

In step S8 of FIG. 7, first, a second strength parameter $k_{USM}$≥0 for setting the strength of the second sharpening process or the second smoothing process is set for a shifted synthesized image $I_S$(j, i). Next, a process of applying a two-dimensional low-pass filter $\{F_{LPF}(j_{LPF}, i_{LPF}) | -n_{LPF} \le j_{LPF} \le n_{LPF}, -m_{LPF} \le i_{LPF} \le m_{LPF}\}$ to the shifted synthesized image $I_S$(j, i) is executed. According to Formula (17), an unsharpness mask $I_{USM}$(j, i) is calculated. It is possible to use a two-dimensional filter such as, for example, '[1, 0, 2, 0, 1]×[1, 0, 2, 0, 1], in the two-dimensional low-pass filter $F_{LPF}$($j_{LPF}$, $i_{LPF}$). When necessary, a two-dimensional Gaussian distribution or the like may be used.

$$I_{USM}(j, i) = I_S(j, i) - \sum_{j_{LPF}=-n_{LPF}}^{n_{LPF}} \sum_{i_{LPF}=-m_{LPF}}^{m_{LPF}} F_{LPF}(j_{LPF}, i_{LPF}) \times I_S(j+j_{LPF}, i+i_{LPF}).$$ (17)

In step S8, finally, the second sharpening or smoothing process is performed. The refocus image $I_{RF}$(j, i) that is an output image is generated by applying the unsharpness mask $I_{USM}$(j, i) according to the image shift difference amount distribution $M_{DIFF}$(j, i) according to Formula (18) to the shifted synthesized image $I_S$(j, i).

$$I_{RF}(j,i)=I_S(j,i)+k_{USM} \times M_{DIFF}(j,i) \times I_{USM}(j,i).$$ (18)

Formula (18) indicates the following process in an area in which the image shift difference amount distribution is greater than or equal to 0 ($M_{DIFF}$(j, i)≥0). That is, the process is a (second sharpening) process of sharpening the shifted synthesized image $I_S(j, i)$ according to a magnitude of the image shift difference amount distribution $M_{DIFF}(j, i)$ using the unsharpness mask $I_{USM}(j, i)$ multiplied by a positive coefficient $k_{USM} \times M_{DIFF}(j, i)$.

On the other hand, Formula (18) indicates the following process in an area in which the image shift difference amount distribution is less than 0 ($M_{DIFF}(j, i) \leq 0$). That is, the process is a (second smoothing) process of smoothing the shifted synthesized image $I_S(j, i)$ according to a magnitude of the image shift difference amount distribution $M_{DIFF}(j, i)$ using the unsharpness mask $I_{USM}(j, i)$ multiplied by a negative coefficient $k_{USM} \times M_{DIFF}(j, i)$.

In the refocusing in the shift synthesis process, it is possible to perform refocusing based on an optical principle using LF data. The refocusing in the shift synthesis process is advantageous in that the process is performed even in an area in which the image shift difference amount distribution is not detectable. The following case is present, however, when the pupil division direction is only one direction of the x-axis direction (the y-axis direction) as in the pupil division of the present embodiment ($N_x=2$, $N_y=1$, and $N_{LF}=2$). That is, the refocus effect is obtained in the x-axis direction (the y-axis direction) of the pupil division direction, but the refocus effect may not be sufficiently obtained in the y-axis direction (the x-axis direction) orthogonal to the pupil division direction. On the other hand, in control of the blur due to sharpening and smoothing according to the image shift difference amount distribution, it is possible to obtain the refocus effect regardless of the pupil division direction. Therefore, in the present invention, a refocus process in which refocusing in the shift synthesis process and control of a blur in sharpening and smoothing according to the image shift difference amount distribution are combined is performed. Thereby, it is possible to obtain the refocus effect even in the direction orthogonal to the pupil division direction.

In the above-described present embodiment, image processing of sharpening and smoothing according to a contrast distribution and an image shift amount distribution is performed on the synthesized image $I_S(j, i)$ of the plurality of corrected viewpoint images and an output image is generated. When necessary, processes of steps S5 to S7 of FIG. 7 that are refocusing in the shift synthesis process may be omitted, image processing of sharpening and smoothing according to the contrast distribution and the image shift amount distribution is performed on the captured image $I(j, i)$, and an output image may be generated. The image processing according to the contrast distribution and the image shift amount distribution may be any one of a sharpening process, a smoothing process, and a combination thereof when necessary.

In the present embodiment, image processing is strongly performed on the following areas according to Formula (7A), Formula (7B), Formula (9), Formula (17), and Formula (18). That is, the image processing, such as sharpening or smoothing, on the synthesized image (or the captured image) of the plurality of corrected viewpoint images is more strongly performed for each viewpoint image in an area in which a difference between contrasts is small than in an area in which the difference between the contrasts is large. Also, the image processing, such as sharpening or smoothing, on the synthesized image (or the captured image) of the plurality of corrected viewpoint images is more strongly performed in an area in which a contrast distribution is large than in an area in which the contrast distribution is small.

Figure 22:
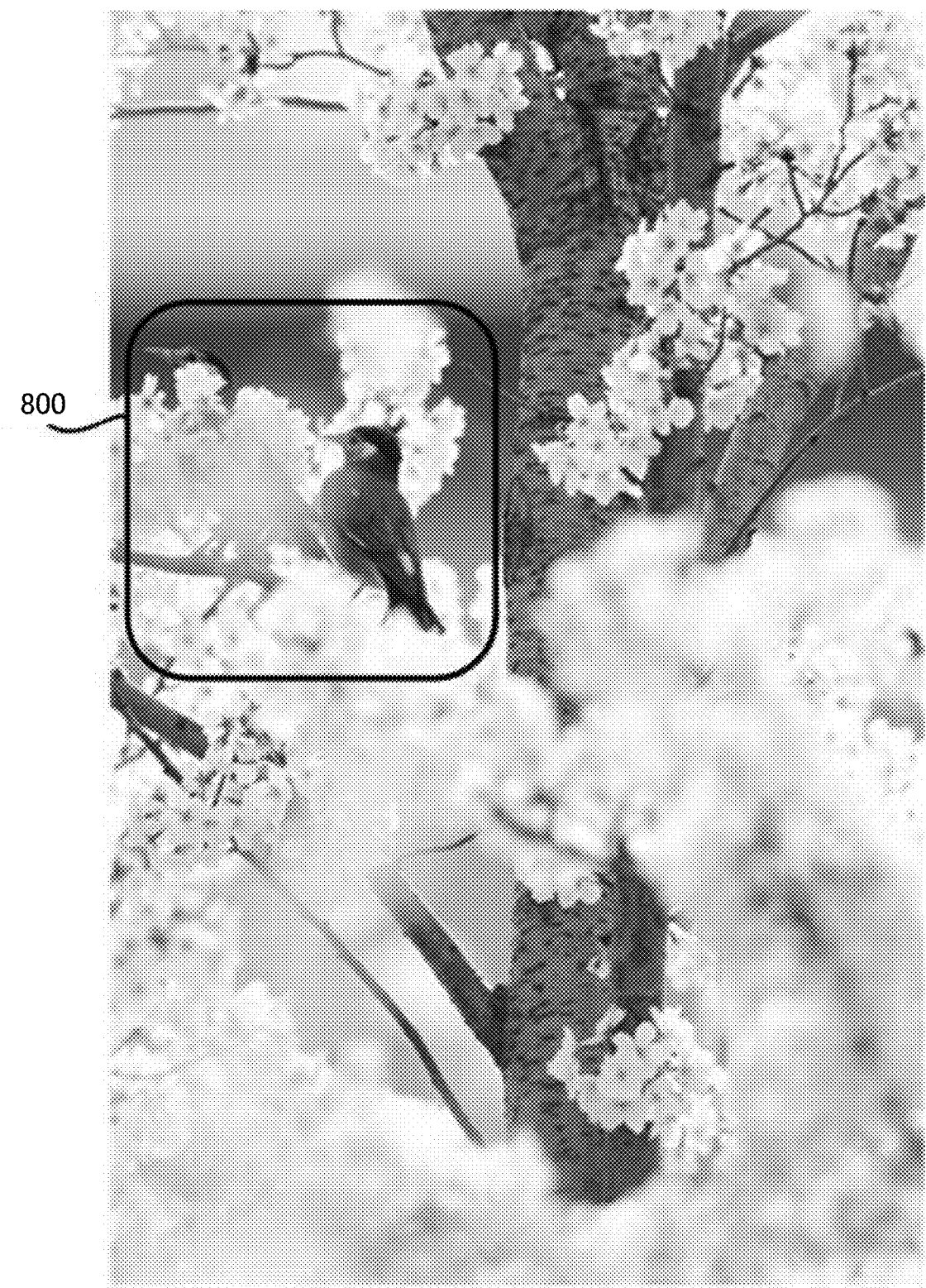
FIG. 22 is a diagram illustrating an example of an image in which foreground blur fogging for a main object occurs.

In the present embodiment, according to Formula (9), Formula (17), and Formula (18), a sharpening process is performed in an area in which a difference from the predetermined shift amount (reference) of the image shift amount distribution is small and a smoothing process is performed in an area in which the difference is large. According to Formula (9), Formula (17), and Formula (18), the sharpening process is more strongly performed in an area in which a difference from a predetermined shift amount of the image shift amount distribution is small than in an area in which the difference is large. Also, according to Formula (9), Formula (17), and Formula (18), the smoothing process is more strongly performed in an area in which a difference from a predetermined shift amount of the image shift amount distribution is large than in an area in which the difference is small. Image Processing of Viewpoint Change and Blur Fogging Correction Next, a second process to be performed in the second processing unit 103 in the present embodiment will be described. The second processing unit 103 generates an image of a virtual viewpoint by synthesizing viewpoint images and detects an amount of ghost (a ghost component) to reduce a ghost (unnecessary light) occurring in the synthesized image. In the second process, image correction to be performed by a change of a synthesis ratio is considered among processes on the plurality of viewpoint images. For example, there are processes such as a viewpoint change process and image blur correction. Hereinafter, an example of a process of correcting foreground blur fogging and reducing a degree thereof will be specifically described. There is a phenomenon in which the main object is hidden if a blur of a foreground (a second object) located in front of the main object (a first object) is large. For example, the photographer may align a focus on the main object among a plurality of objects and perform photographing for effectively emphasizing the main object by intentionally blurring the foreground or the background. FIG. 22 illustrates an example of an image in which a foreground blur is applied to the main object against the intention of the photographer by blurring the foreground. In an area 800 of FIG. 22, a foreground (flowers) located on the side in front (the near side) of the main object (a bird) is significantly blurred. Thus, the foreground blur fogging in which the main object is hidden occurs. To prevent the quality of a captured image from being degraded, the CPU 170 determines a synthesis ratio when a plurality of viewpoint images are synthesized so that the foreground blur does not affect an image of an object intended by the user in a process of reducing the foreground blur fogging.

The reduction of a degree of foreground blur fogging for the main object is executed by the image processing unit 130 according to an instruction of the CPU 170. The image processing unit 130 performs a process to be described below by acquiring a plurality of viewpoint images acquired by the imaging element 110. By setting j and i as integer variables, a position that is $j^{th}$ in the row direction and is $i^{th}$ in the column direction in the first and second viewpoint images is denoted by (j, i). A pixel of the position (j, i) in the first viewpoint image A is denoted by A(j, i) and a pixel of the position (j, i) in the second viewpoint image B is denoted by B(j, i).

A first step is a process of setting a predetermined area (denoted by R) for reducing a degree of foreground blur fogging for the main object and its boundary width (denoted by σ) and calculating a table function (denoted by T(j, i)). The CPU 170 sets the boundary width σ of the predetermined area R by setting a predetermined area $R=[j_1, j_2] \times$

[$i_1$, $i_2$]. The CPU 170 calculates the table function T(j, i) according to the predetermined area R and its boundary width σ according to the above-described Formula (12).

A second step is a process of calculating weighting coefficients for the first and second viewpoint images. The CPU 170 calculates a first weighting coefficient $W_a$(j, i) of the pixel A(j, i) according to Formula (19A) by setting a real coefficient w (−1≤w≤1). Likewise, the CPU 170 calculates a second weighting coefficient $W_b$(j, i) of the pixel B(j, i) according to Formula (19B).

$$W_a(j,i)=1-wT(j,i) \quad (19A)$$

$$W_b(j,i)=1+wT(j,i) \quad (19B)$$

A third step is an image generation process using a weighting coefficient. The image processing unit 130 generates an output I(j, i) according to Formula (20) from the pixels A(j, i) and B(j, i) and the weighting coefficients $W_a$(j, i) and $W_b$(j, i).

$$I(j,i)=W_a(j,i)*A(j,i)+W_b(j,i)*B(j,i) \quad (20)$$

When necessary, the image processing unit 130 generates an output image $I_s$(j, i) according to Formula (21A) or (21B) in combination with a refocus process based on a shift amount s. Also, according to the denotation of Formula (14) described above, the following A(j, i) and B(j, i) correspond to $MI_1$(j, i) and $MI_2$(j, i), respectively.

$$I_s(j,i)=W_a(j,i)*A(j,i)+W_b(j,i)*B(j,i+s) \quad (21A)$$

$$I_s(j,i)=W_a(j,i)*A(j,i)+W_b(j,i+s)*B(j,i+s) \quad (21B)$$

Next, a principle of image processing for reducing a degree of foreground blur for the main object will be described with reference to FIGS. 13A to 13C. The imaging element 110 is arranged on the imaging plane 600, and the exit pupil of the image forming optical system is divided into the two pupil part areas 401 and 402. FIG. 13A is an optical path diagram illustrating an example of a foreground blur fogging image for the main object. FIG. 13A illustrates a state in which a blurred image (Γ1+Γ2) of the front-side object q2 is captured to overlap the image p1 (a focus image) of the main object q1. FIGS. 13B and 13C illustrate optical path diagrams in which a light beam passing through the pupil part area 401 and a light beam passing through the pupil part area 402 are separated with respect to the state illustrated in FIG. 13A. In each pixel of the imaging element 110, a first viewpoint image is generated from a light reception signal of the first photoelectric conversion unit 301, and a second viewpoint image is generated from a light reception signal of the second photoelectric conversion unit 302.

In FIG. 13B, a light beam from the main object q1 passes through the pupil part area 401 and image formation is performed in an image p1 in a focused state, a light beam from the front-side object q2 passes through the pupil part area 401 and spreads to a blurred image Γ1 in a defocused state, and light is received in the photoelectric conversion unit of each pixel of the imaging element 110. In the first viewpoint image, the image p1 and the blurred image Γ1 are captured without overlapping each other. In this case, in a predetermined area (near the image p1 of the object q1), an object (the blurred image Γ1 of the object q2) of the near side is photographed in a narrowest range in the first and second viewpoint images. Also, in a predetermined area (near the image p1 of the object q1), the appearance of the blurred image Γ1 of the object q2 is less and a contrast evaluation value is largest in the first and second viewpoint images.

On the other hand, in FIG. 13C, a light beam from the main object q1 passes through the pupil part area 402 and image formation is performed in the image p1 in a focused state, a light beam from the front-side object q2 passes through the pupil part area 402 and spreads to a blurred image Γ2 in a defocused state, and light is received in the photoelectric conversion unit of each pixel of the imaging element 110. In the second viewpoint image, the image p1 and the blurred image Γ2 are captured without overlapping each other. In a predetermined area (near the image p1 of the object q1), an object (the blurred image Γ2 of the object q2) of the near side is photographed in a widest range in the first and second viewpoint images. Also, in a predetermined area (near the image p1 of the object q1), the appearance of the blurred image Γ2 of the object q2 is large, and a contrast evaluation value is smallest in the first and second viewpoint images.

In a predetermined area (near the image p1), the first weighting coefficient $W_a$ for the first viewpoint image, in which the overlap between the image p1 and the blurred image Γ1 is small, is set to be greater than the second weighting coefficient $W_b$ for the second viewpoint image in which the overlap between the image p1 and the blurred image Γ2 is large. For example, in a predetermined area of the output image, a weighting coefficient value of the viewpoint image, in which the object of the near side is captured in the widest range among the plurality of viewpoint images, is smallest, or a weighting coefficient value of the viewpoint image, in which the object of the near side is captured in the narrowest range, is largest. Also, in a predetermined area of the output image, the weighting coefficient value of the viewpoint image, in which the contrast evaluation value is smallest, is smallest, or the weighting coefficient value of the viewpoint image, in which the contrast evaluation value is largest, is largest.

Figure 23A:
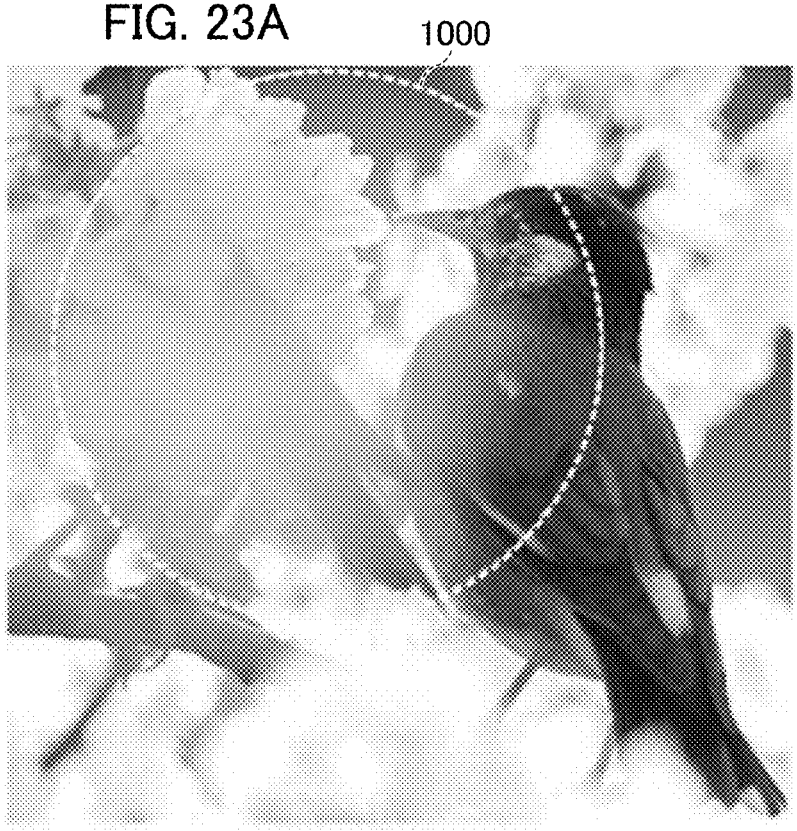
FIGS. 23A and 23B are explanatory diagrams of an effect of foreground blur fogging correction.
Figure 23B:

It is possible to generate an image in which the foreground blur fogging for the main object is reduced by generating a synthesized output image using a weighting coefficient. A reduction effect of the foreground blur fogging by the blur adjustment process will be described with reference to FIGS. 23A and 23B. FIGS. 23A and 23B illustrate an image example before the blur adjustment process. Foreground blur fogging of a second object (flowers) for a first object (a bird) in a predetermined area 1000 occurs. FIG. 23B illustrates an image example after the blur adjustment process. As indicated in the predetermined area 1000 within a circular frame of the dotted line in the image of FIG. 23A, the beak, eyes, and wings of the bird are covered with the foreground blur of the flowers in white. On the other hand, in the image of FIG. 23B, this foreground blur is reduced. Because a blur shape is not changed outside a predetermined area in which no blur adjustment process is performed when necessary, a weighting coefficient value is generally equally added for each of the plurality of viewpoint images and an output image is generated.

Next, a ghost reduction process to be performed by the second processing unit 103 and the synthesis unit 105 will be described. The second processing unit 103 performs a process of determining a ghost (unnecessary light) and a ghost reduction process of reducing or removing the ghost.

In the present embodiment, a process of calculating unnecessary components in the viewpoint images and synthesizing the unnecessary components of viewpoint images in a similar process in accordance with a process of synthesizing the viewpoint images of an output image is performed, and the unnecessary components are subtracted from a synthesized image.

Figure 24:
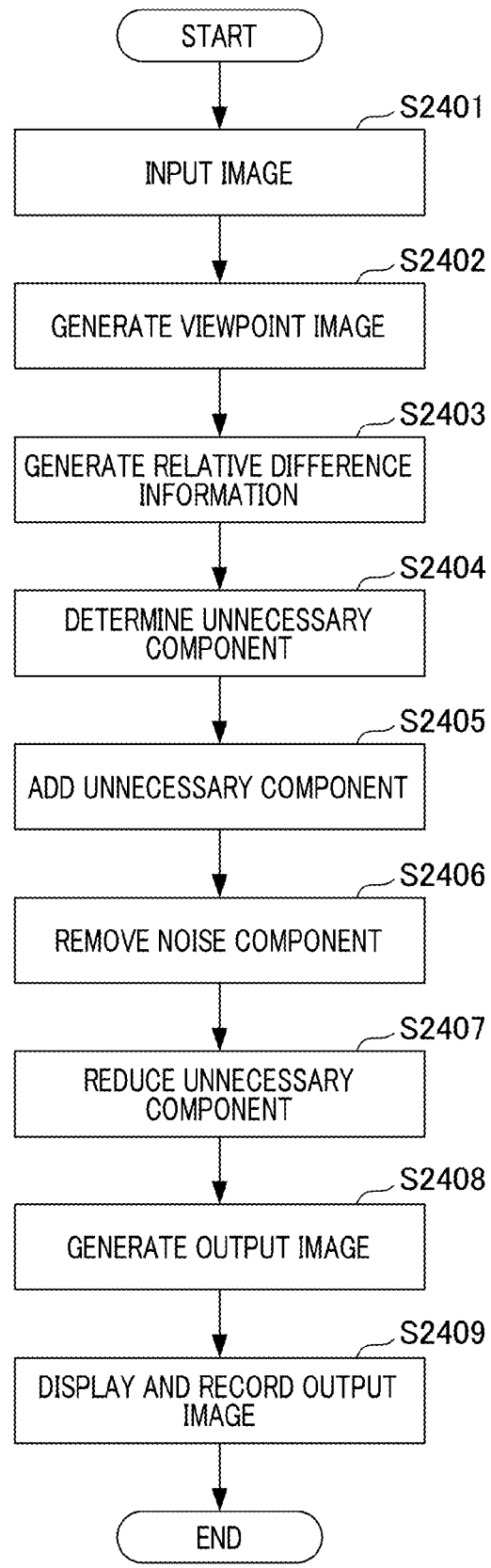
FIG. 24 is a flowchart of a ghost reduction process in an embodiment of the present invention.

FIG. 24 illustrates a flowchart of a process of determining an unnecessary component (a ghost component) in the present embodiment. The following steps are mainly executed according to an image processing program serving as a computer program by the CPU 170 or the image processing unit 130, or an execution instruction is output to each part. The following process starts, for example, when the imaging element 110 captures an image (for example, during a mode in which sequentially imaged digital signals are output or during recording immediately after imaging), or when image data from the memory is read to a temporary storage area within the image processing unit 130.

First, in step S2401, the CPU 170 controls an imaging unit (an imaging system) constituted of the photographing lens 230, the imaging element 110, and the A/D converter 120, such that the imaging unit images an object and acquires an input image (a captured image). Alternatively, image data captured in advance and recorded on the image recording medium 107 is read to a temporary storage area within the image processing unit 130, so that the input image is acquired. In the present embodiment, a synthesized image obtained by synthesizing a plurality of viewpoint images corresponding to light beams passing through different pupil areas of the photographing lens 230 within the imaging element 110 as the input image and a viewpoint image corresponding to a partial pupil area before synthesis is acquired as the input image. The present invention is not limited to the synthesized image and the viewpoint image as the input image, and each of the plurality of viewpoint images may be acquired as the input image.

In step S2402, the CPU 170 controls the image processing unit 130 and causes a pair of viewpoint images to be generated from the synthesized image and the viewpoint image. Specifically, it is possible to calculate a plurality of viewpoint images by taking a difference. Here, the image processing unit 130 may execute some of various types of image processing as described above when the viewpoint image is generated. If an input image is acquired in the form of a plurality of viewpoint images in step S2401, only some of various types of image processing may be performed in the present step.

Next, in step S2403, the image processing unit 130 obtains relative difference information of a pair of viewpoint images by taking a difference between the viewpoint images. Here, in the present embodiment, a process of rounding a negative value in the relative difference information down to a value of 0 to simplify an unnecessary component reduction process to be described below is performed. Thus, an unnecessary component is detected only as a positive value.

Also, a process of aligning a pair of viewpoint images may be executed to remove the object viewpoint difference component when the relative difference information is obtained in an image including a short-range object. Specifically, it is possible to perform image alignment by determining a shift position at which a correlation between images is maximized, while relatively shifting a position of the other image with respect to one image between the pair of viewpoint images. Also, the image alignment may be performed by determining a shift position at which a sum of the squares of the differences between the viewpoint images is minimized. Also, a focused area of the viewpoint image may be a target for determining a shift position for alignment.

Also, edge detection may be performed in each viewpoint image in advance, and a shift position for alignment using an image indicating the detected edge may be determined. According to this method, it is difficult to detect an edge having a high contrast in the focused area and to detect an edge having a low contrast in a non-focused area, such as a background. Thus, a shift position at which the focused area is inevitably emphasized is determined. Also, when the relative difference image is generated, a step, such as threshold value processing, may be added to remove an influence, such as noise.

Next, in step S2404, a process of determining a component remaining in the relative difference image generated in step S2403 as an unnecessary component is executed. In step S2405, the image processing unit 130 adds unnecessary components of viewpoint images determined in step S2404 (a synthesis value of the unnecessary components is calculated).

Next, in step S2406, the image processing unit 130 performs a correction process of reducing or removing a noise component from an unnecessary component. Specifically, a process of subtracting noise included in an unnecessary component of each viewpoint image from the synthesis value of unnecessary components calculated in step S2405 is executed.

Here, a procedure of the correction process of reducing or removing a noise component from a ghost component in step S2406 will be described. First, a noise component is calculated on the basis of a standard deviation of a noise component (noise information) of the imaging element 110 measured in advance. Here, a predicted value of the noise component is measured from a result of pre-imaging an object of uniform luminance by the imaging element 110 and obtained for every ISO sensitivity having a large influence on noise, and is tabled. The present measurement for each of the plurality of viewpoint images is time-consuming and is affected by shading for each viewpoint image. Therefore, in the present embodiment, the noise component is determined from data measured in the above-described synthesized image in which a plurality of viewpoints corresponding to light beams from different pupil areas of an optical system are synthesized. Also, all pixels for every ISO may have a uniform noise component on the basis of a measured value as a noise component, and each pixel may uniformly have the noise component at each image height. A process of subtracting the calculated noise component from the calculated synthesis value of the unnecessary components is performed. At this time, because a noise component included in an unnecessary component of each viewpoint image is added for each process of adding unnecessary components calculated in step S2405, it is necessary to perform the process of subtracting the noise component (the number of viewpoint images −1) times. A method of subtracting the noise component is not limited thereto. For example, the standard deviation of the noise component of each viewpoint image may be calculated from an image. At this time, specifically, a process of dividing an image into (10×10) local areas, calculating the standard deviation of a pixel value within each area, and subtracting the noise component in each area is performed.

Next, in step S2407, the image processing unit 130 performs a correction process of reducing or removing an unnecessary component from an image to be output. Specifically, a process of subtracting the unnecessary component calculated in step S2405 from the synthesized image acquired in step S2401 is performed. Here, in the case of an embodiment in which only a plurality of viewpoint images are acquired without acquiring a synthesized image in step S2401, a corrected image is generated by subtracting the unnecessary component calculated in step S2405 from the synthesized image generated by synthesizing a plurality of viewpoint images. In step S2408, the image processing unit 130 performs a general process on the corrected image and generates an output image to be output to the recording medium 160 or the image display unit 220. At this time, in addition to a developing process such as a normal white balance process or gamma correction, a well-known noise reduction process is also performed on a corrected image. In this process, it is possible to reduce noise on the corrected image.

Finally, in step S2409, the CPU 170 performs control such that an output image from which an unnecessary component is removed or reduced is recorded on the recording medium 160. Alternatively, a process of displaying the output image on the image display unit ends.

As described above, it is possible to implement a good process of reducing the number of unnecessary components from an image by reducing or removing a noise component from the unnecessary component in the image processing device that reduces the number of unnecessary components due to unnecessary light or the like from an image based on a plurality of viewpoint images.

In the present embodiment, an example of a synthesized image previously subjected to analog synthesis within an imaging sensor at the time of an output from the sensor, or a synthesized image obtained by synthesizing a plurality of viewpoint images is shown using a target image of the ghost reduction process as an image based on a plurality of viewpoint images. The target image of the process is not, however, limited thereto. For example, a corresponding unnecessary component may be calculated from any viewpoint image, or the like, and a reduction process may be performed.

Figure 25:
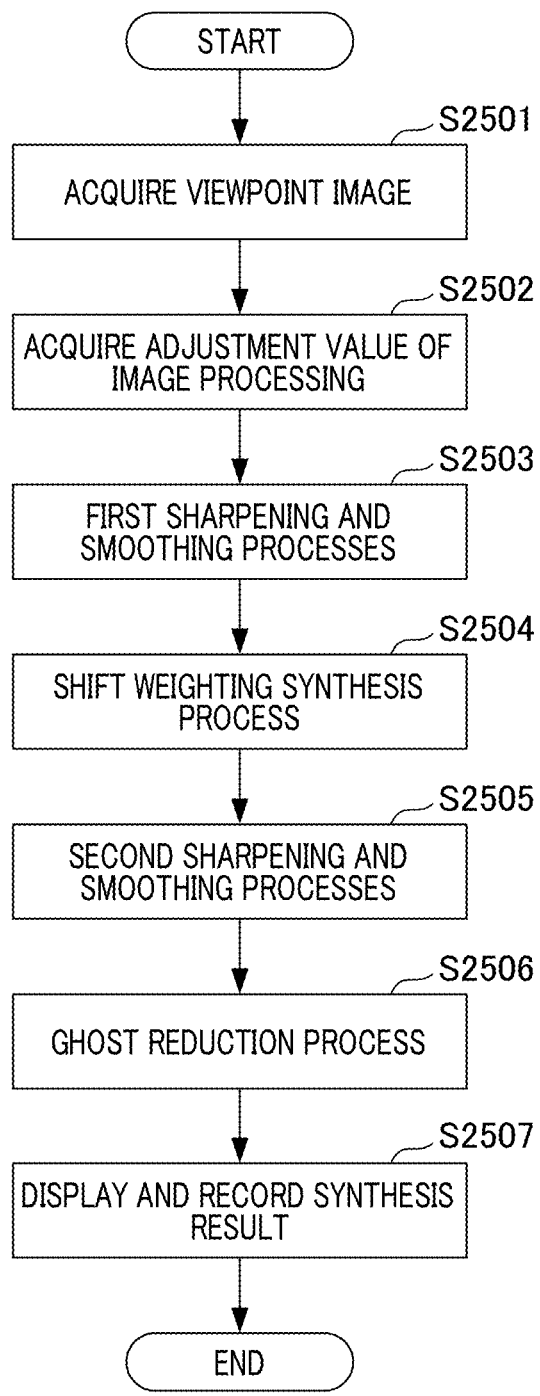
FIG. 25 is a flowchart of an operation of an image processing device in an embodiment of the present invention.

FIG. 25 is a flowchart illustrating an operation of the image processing device in the present embodiment. The following process is executed by the CPU 170 or each part according to an instruction of the CPU 170. In the present embodiment, an image processing device in which a plurality of distinctive image processings using a plurality of viewpoint images are able to be applied to an image is implemented.

In step S2501, data of a plurality of viewpoint images is acquired from a photoelectrically converted signal after the first and second photoelectric conversion units of each pixel of the imaging element 110 receive light. An input of the plurality of viewpoint images is not limited to an image immediately after imaging, and it is possible to acquire an image file via a memory card or a network. Also, there is a method of applying a set value pre-maintained by the image processing device as a method of designating an adjustment value according to a user operation using a user interface (UI) unit.

In step S2502, the CPU 170 acquires the above-described adjustment value of at least one of a process of adjusting a perceived resolution, a viewpoint change process, or a blur fogging correction process, and a ghost reduction process for a viewpoint image. The CPU 170 acquires the presence/absence of application of the process of adjusting the perceived resolution input from the operation unit 210 by the user, adjustment values of strengths of first sharpening and smoothing processes and second sharpening and smoothing processes, and an adjustment value of a shift amount for shift synthesis. Also, the CPU 170 acquires the presence/absence of application of the viewpoint change process input from the operation unit 210 by the user, position information of an area within an image for which a viewpoint is changed, and an adjustment value indicating an adjusted position of a viewpoint. Also, the CPU 170 acquires the presence/absence of application of the ghost reduction process input from the operation unit 210 by the user, position information of an area for application thereto, and an adjustment value related to the strength of the process.

In the present embodiment, types of image and image processing and an adjustment value are set on an application provided by the image processing device for a synthesized image (a captured image) of a plurality of viewpoint images obtained from the imaging element 110. Thereby, it is possible to perform the process of adjusting the perceived resolution, the viewpoint change process, and the ghost reduction process on the synthesized image. Further, in the present embodiment, it is possible to apply the image processing to the same image.

Here, if there is a plurality of viewpoint images corresponding to pupil division areas, as in the present embodiment as described above, the gradual pupil division is performed. Thus, it is desirable to apply the first sharpening and smoothing processes for further improving the effect of the adjustment process to the viewpoint image for use in the process of adjusting the perceived resolution. When the smooth viewpoint change is made in the gradual pupil division for the ghost reduction process or the viewpoint change process, however, a synthesis result in which it is difficult to view a joint is obtained. Therefore, in the present embodiment, an influence of the first sharpening and smoothing processes on another process is reduced by weakly setting the strengths of the first sharpening and smoothing processes to be performed when the process of adjusting the perceived resolution is applied as compared with when the other process is not applied. Of course, the case in which the strengths of the first sharpening and smoothing processes are weakly set also includes the case in which the first sharpening and smoothing processes are not performed.

Also, because a technique of subtracting the ghost component calculated from each viewpoint image from the synthesized image is taken, it is more preferable to apply the ghost reduction process finally after another process ends. In view of the above description, each image processing is performed in the following flow.

In step S2503, the first sharpening and smoothing processes are performed if the process of adjusting the perceived resolution is set. The CPU 170 performs the first sharpening and smoothing processes on a plurality of viewpoint images on the basis of adjustment values of strengths of the first sharpening and smoothing processes acquired on the basis of an operation input to the operation unit 210.

In step S2504, a process of synthesizing a plurality of viewpoint images is performed on the basis of settings of a relative shift of a plurality of viewpoint images according to the process of adjusting the perceived resolution and a synthesis ratio according to the viewpoint change process. If the first sharpening and smoothing processes are performed on the viewpoint image, the synthesis process is performed on the plurality of viewpoint images after the application on the basis of a shift based on the adjustment value and a synthesis ratio based on position information of an area for application thereto and information of an adjustment value of a viewpoint as in Formula (21A) or Formula (21B). Also, if the ghost reduction process is performed thereafter, each viewpoint image immediately before synthesis is assumed to be stored in the memory.

In step S2505, the second sharpening and smoothing processes related to the process of adjusting the perceived resolution are performed on an image after synthesis. Here, the corresponding second sharpening and smoothing processes are also performed on the viewpoint image immediately before synthesis stored in the memory. In step S2506, the above-described ghost reduction process is performed using the synthesized image after the second sharpening and smoothing processes and each viewpoint image.

In step S2507, a display process or a recording process on the synthesis result is performed. A synthesized image obtained as a result of processing up to S2506 is displayed on a display device, such as the image display unit 220, and/or recorded in a recording unit, such as the recording medium 160, or the like, and a series of operations end. If the user views the displayed synthesized image after image processing and changes the image processing (the adjustment value) again, the process of the present flowchart is executed from the beginning again. Also, in addition to the image display in the output form of the synthesized image in step S2507, there is a form in which the synthesized image is recorded as an image file in a recording medium such as a memory card. Also, there is a form in which an image file saved in the recording medium is transmitted to an external device via a network or the like.

As described above, according to the present embodiment, an image processing device capable of appropriately performing a plurality of distinctive synthesis processes using a plurality of viewpoint images is implemented. It is possible to selectively apply a plurality of different image processings to the image data and to simultaneously apply a plurality of adjustment values determined for adjustment items for the viewpoint image.

Second Embodiment

Next, the second embodiment of the present invention will be described. The configuration of the image processing device and the description of each image processing related to FIGS. 1 to 25 are similar to those of the first embodiment. Components of the present embodiment similar to those of the first embodiment use already-used reference signals, and detailed description thereof is omitted. Therefore, differences between the embodiments will be mainly described. This omission of the description is true for the following embodiment.

The control unit 104 of FIG. 1 has a plurality of control modes and only a first process is executed if a first condition is satisfied in a first control mode. That is, only a first processing unit 102 executes a process only in the case of a specific condition being met. Alternatively, if a second processing unit 103 is not included in the installation of the device, only a process of the first processing unit 102 is executed. The first condition is, for example, as described below.

If Effect of Ghost Reduction Process is Small

The ghost reduction process is a process of reducing a ghost occurring under the specific condition using a viewpoint image. According to a specific combination of a camera and a lens, the ghost reduction effect may be small. If a combination with the small effect is predetermined, the CPU 170 performs control such that the second process is not executed. That is, if an image captured in the condition of the small ghost reduction effect is input, control is performed such that the reception of the adjustment value related to the second process is prevented. The CPU 170 draws the user's attention by clearly displaying that adjustment is unnecessary on a display screen of the image display unit 220.

When Image Processing Device in which Program According to the Present Embodiment is Embedded is Specialized in Refocus Function In a case in which the image processing device in which the program according to the present embodiment is embedded is specialized in a refocus function, only the first process is executed and the user can only adjust refocusing. In the present embodiment, application of only the first process is effective under the first condition, and the processing load or the power consumption can be reduced without applying the second process.

Third Embodiment

Next, the third embodiment of the present invention will be described. The configuration of the image processing device and the description of each image processing related to FIGS. 1 to 25 are similar to those of the first embodiment. The control unit 104 of FIG. 1 has a plurality of control modes, and only a second process is executed if a second condition is satisfied in a second control mode. That is, only the second processing unit 103 executes a process only in the case of a specific condition being met. Alternatively, when the first processing unit 102 is not included in the installation of the device, only a process of the second processing unit 103 is executed. The second condition is, for example, as described below.

If a Refocus Process is Unnecessary (Effect is Small)

The shift synthesis process of virtually changing a focus during the process of adjusting a perceived resolution is not problematic in terms of a defocus, and its application may be unnecessary (the effect may be small). Thus, the refocus process can be regarded to be unnecessary according to a state during photographing in combination with object information, or the like, from face recognition, or the like.

If Image Processing Device in which Program According to Present Embodiment is Embedded is Specialized for Ghost Reduction Function In this case, there is no room for performing the first process, and only removal or reduction of an appearing ghost is possible. In the present embodiment, application of only the second process is effective under the second condition, and the processing load or the power consumption can be reduced without applying the first process.

Both the first condition described in the second embodiment and the second condition described in the third embodiment may not be satisfied, and the control unit 104 of FIG. 1 also may perform control in which first and second processes are not executed. For example, because the degree of depth of the object is deep if the user squeezes the aperture during photographing, the effect of the parallax is reduced. In extreme cases, the effect of the parallax is absent, and the effect of the refocus process, the ghost reduction process, or the like using the parallax is lost. In the case of photographing in this photographing condition, the control unit 104 presents message display or the like to the user, and does not perform adjustment, so that processing of a viewpoint image is not applied. Also, noise may increase by improving the ISO sensitivity in addition to the aperture. In the case of an ISO sensitivity greater than or equal to a certain fixed level, the control unit 104 does not perform adjustment similar to the case of the aperture. As described above, in the case of the specific condition being met, the control unit 104 disables the first and second processes without applying the first and second processes. Thereby, it is possible to achieve operational ease and securing of image quality or the like.

Fourth Embodiment

Next, the fourth embodiment of the present invention will be described. The configuration of the image processing device and the description of each image processing related to FIGS. 1 to 25 are similar to those of the first embodiment. It is characterized in that control is exclusively performed using the fact that image processing using a plurality of viewpoint images described in the first embodiment does not affect each other. In the present embodiment, it is possible to exclusively select a plurality of image processings using a plurality of viewpoint images by the operation unit 210 of FIG. 2, and information of set image processing in step S2502 of FIG. 25 and information of its adjustment value are acquired. In steps S2503 to S2506, only the selected image processing and the process related to the adjustment value are performed, and other processes and steps are ignored.

Here, a further additional advantage of exclusive control will be described. If a refocus calculation is performed in the first process, the CPU 170 does not perform foreground blur fogging correction in the second process. The image processing unit 130 requires a shift amount s if an output image $I_S(j, i)$ is generated according to Formula (4A) or (4B). Thus, processing is likely to be delayed because a predetermined time or more is required to generate the output image $I_S(j, i)$ before the shift amount s is determined. In this case, the CPU 170 exclusively controls the first process and the second process, and the shift amount s is predetermined if the foreground blur fogging correction is performed in the second process. In this case, it is possible to reduce the processing load of the image processing unit 130 without executing the first process. In the present embodiment, it is possible to perform a plurality of types of image processing on a plurality of viewpoint images at a suitable timing by exclusively controlling the first process and the second process.

OTHER EMBODIMENTS

Embodiments of the present invention can also be realized by a computer of a system or apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or an apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing device comprising:
   (A) a plurality of image sensors configured to acquire a plurality of viewpoint images;
   (B) a memory that stores instructions; and
   (C) at least one processor coupled to the memory and configured to execute the instructions:
      (a) to perform image processing on image data based on the plurality of viewpoint images acquired by the plurality of image sensors, and to selectively apply, in performing image processing, a plurality of different image processings to the image data, the plurality of different image processings including:
         (i) an adjustment process of adjusting a perceived resolution of an image, the adjustment process including a shift synthesis process of relatively shifting the plurality of viewpoint images to synthesize the plurality of viewpoint images that are relatively shifted;
         (ii) a viewpoint change process of changing a viewpoint by changing a weighting coefficient when the plurality of viewpoint images are synthesized; and
         (iii) a ghost reduction process of generating an image in which an influence of a ghost of the plurality of viewpoint images is reduced;
      (b) to set the image processing to be applied in performing the image processing by exclusively setting one of the plurality of different image processings and to set a parameter of the image processing to be applied to the image data; and
      (c) to perform other image processing using the plurality of viewpoint images for which the ghost is reduced according to the ghost reduction process if the ghost reduction process is set and one of the adjustment process and the viewpoint change process is applied.

2. The image processing device according to claim 1, wherein the at least one processor further executes the instructions (d) to output an image generated by synthesizing the plurality of viewpoint images according to the set image processing.

3. The image processing device according to claim 1, wherein the at least one processor further executes the instructions (d) to perform at least one of a sharpening process and a smoothing process on the plurality of viewpoint images before performing the one of the plurality of different image processings.

4. The image processing device according to claim 1, wherein the at least one processor further executes the instructions (d) to perform at least one of a sharpening process and a smoothing process on the plurality of viewpoint images before performing the one of the plurality of different image processings, wherein the sharpening process and the smoothing process are performed more weakly when one of the viewpoint change process and the ghost reduction process is set to be applied with the adjustment process than when only the adjustment process is set to be applied.

5. The image processing device according to claim 1, wherein the at least one processor further executes the instructions (d) to synthesize the plurality of viewpoint images after a shift at a synthesis ratio according to the shift synthesis process included in the viewpoint change process by relatively shifting the plurality of viewpoint images according to the adjustment process if the adjustment process and the viewpoint change process are set to be applied.

6. The image processing device according to claim 1, wherein the adjustment process includes one of a process of performing a sharpening process and a smoothing process on an image on the basis of at least one of a distance from a focusing position of the image and a contrast.

7. The image processing device according to claim 1, wherein the ghost reduction process includes a process of subtracting a ghost component obtained on the basis of a difference among the plurality of viewpoint images from an image.

8. The image processing device according to claim 1, wherein the plurality of image sensors includes a plurality of photodiodes that obtain pixels signals by photoelectrically converting light passing through different pupil part areas of the plurality of image sensors, and the plurality of image sensors acquires the plurality of viewpoint images generated from the obtained pixel signals.

9. An imaging device comprising:
(A) a plurality of image sensors configured to acquire an image of an object;
(B) a memory that stores instructions; and
(C) at least one processor coupled to the memory and configured to execute the instructions:
  (a) to perform image processing on image data based on the plurality of viewpoint images acquired by the plurality of image sensors, and to selectively apply a plurality of different image processings to the image data, the plurality of different image processings including:
    (i) an adjustment process of adjusting a perceived resolution of an image, the adjustment process including a shift synthesis process of relatively shifting the plurality of viewpoint images to synthesize the plurality of viewpoint images that are relatively shifted;
    (ii) a viewpoint change process of changing a viewpoint by changing a weighting coefficient when the plurality of viewpoint images are synthesized; and
    (iii) a ghost reduction process of generating an image in which an influence of a ghost of the plurality of viewpoint images is reduced; and
  (b) to set the image processing to be applied in performing the image processing by exclusively setting one of the plurality of different image processings and to seta parameter of the image processing to be applied to the image data; and
  (c) to perform other image processing using the plurality of viewpoint images for which the ghost is reduced according to the ghost reduction process if the ghost reduction process is set and one of the adjustment process and the viewpoint change process is applied.

10. The imaging device according to claim 9, wherein each of the plurality of image sensors includes at least one microlens and a plurality of photodiodes, and
wherein signals of the plurality of viewpoint images are generated from signals output from the plurality of photodiodes corresponding to the plurality of image sensors.

11. The imaging device according to claim 10, wherein the plurality of different image processings further includes (iv) a refocus calculation that calculates a shift amount, and
wherein the at least one processor further executes the instructions (d) to detect a defocus amount from the shift amount calculated in the performed refocus calculation.

12. An image processing method comprising:
(A) acquiring a plurality of viewpoint images;
(B) performing image processing on image data, based on the plurality of viewpoint images, by selectively applying one or more of a plurality of different image processings to the image data, the plurality of image processings including:
  (a) an adjustment process of adjusting a perceived resolution of an image, the adjustment process including a shift synthesis process of relatively shifting the plurality of viewpoint images to synthesize the plurality of viewpoint images that are relatively shifted;
  (b) a viewpoint change process of changing a viewpoint by changing a weighting coefficient when the plurality of viewpoint images are synthesized; and
  (c) a ghost reduction process of generating an image in which an influence of a ghost of the plurality of viewpoint images is reduced;
(C) setting the image processing to be applied in the step of performing the image processing, one of the plurality of different image processings being exclusively set, and a parameter of the image processing to be applied to the image data being settable in the setting; and
(D) performing other image processing using the plurality of viewpoint images for which the ghost is reduced according to the ghost reduction process if the ghost reduction process is set and one of the adjustment process and the viewpoint change process is applied.

13. A non-transitory computer-readable recording medium storing a program for causing a computer to execute an image processing method comprising:
(A) acquiring a plurality of viewpoint images;
(B) performing image processing on image data, based on the plurality of viewpoint images, by selectively applying one or more of a plurality of different image processings to the image data, the plurality of image processings including:
  (a) an adjustment process of adjusting a perceived resolution of an image, the adjustment process including a shift synthesis process of relatively shifting the plurality of viewpoint images to synthesize the plurality of viewpoint images that are relatively shifted;
  (b) a viewpoint change process of changing a viewpoint by changing a weighting coefficient when the plurality of viewpoint images are synthesized; and
  (c) a ghost reduction process of generating an image in which an influence of a ghost of the plurality of viewpoint images is reduced;
(C) setting the image processing to be applied in the step of performing the image processing one of the plurality of different image processings being set exclusively, and a parameter of the image processing to be applied to the image data being settable in the setting; and (D) performing other image processing using the plurality of viewpoint images for which the ghost is reduced according to the ghost reduction process if the ghost reduction process is set and one of the adjustment process and the viewpoint change process is applied.

* * * * *